(12) United States Patent
Cox et al.

(10) Patent No.: US 11,306,798 B2
(45) Date of Patent: *Apr. 19, 2022

(54) POSITION SENSITIVE SUSPENSION DAMPING WITH AN ACTIVE VALVE

(71) Applicant: Fox Factory, Inc., Duluth, GA (US)

(72) Inventors: Christopher Paul Cox, Capitola, CA (US); John Marking, El Cajon, CA (US); Everet Owen Ericksen, Santa Cruz, CA (US)

(73) Assignee: Fox Factory, Inc., Duluth, GA (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/175,656

(22) Filed: Oct. 30, 2018

(65) Prior Publication Data

US 2019/0203798 A1 Jul. 4, 2019

Related U.S. Application Data

(60) Continuation-in-part of application No. 16/105,639, filed on Aug. 20, 2018, and a continuation-in-part of
(Continued)

(51) Int. Cl.
*F16F 9/48* (2006.01)
*F16F 9/49* (2006.01)
(Continued)

(52) U.S. Cl.
CPC ............ *F16F 9/48* (2013.01); *B60G 13/08* (2013.01); *B60G 17/08* (2013.01); *F16F 9/18* (2013.01);
(Continued)

(58) Field of Classification Search
CPC ...... B60G 17/08; B60G 17/048; B60G 13/08; B60G 2202/24; B60G 2206/41;
(Continued)

(56) References Cited

U.S. PATENT DOCUMENTS

| 435,995 A | 9/1890 | Dunlop |
|---|---|---|
| 1,078,060 A | 11/1913 | Newman |

(Continued)

FOREIGN PATENT DOCUMENTS

| DE | 1555311 A1 | 8/1970 |
|---|---|---|
| DE | 3613386 A1 | 10/1986 |

(Continued)

OTHER PUBLICATIONS

European Search Report for European Application No. 19157767, dated Oct. 16, 2019, 9 Pages.
(Continued)

*Primary Examiner* — Xuan Lan Nguyen

(57) ABSTRACT

Methods and apparatus for position sensitive dampening with an active valve. In one aspect a fluid damper is provided comprising a damper chamber divided by a piston into a primary compression and a primary rebound chamber; a secondary compression chamber in fluid communication with the damper chamber; and an active valve controlling fluid flow out of the secondary compression chamber.

8 Claims, 12 Drawing Sheets

Related U.S. Application Data application No. 16/042,563, filed on Jul. 23, 2018, which is a continuation of application No. 15/275,078, filed on Sep. 23, 2016, now Pat. No. 10,040,329, said application No. 16/105,639 is a continuation of application No. 15/056,940, filed on Feb. 29, 2016, now Pat. No. 10,054,185, said application No. 15/275,078 is a division of application No. 14/466,831, filed on Aug. 22, 2014, now Pat. No. 9,452,654, which is a continuation-in-part of application No. 14/251,446, filed on Apr. 11, 2014, now Pat. No. 10,047,817, said application No. 15/056,940 is a continuation of application No. 14/022,030, filed on Sep. 9, 2013, now Pat. No. 9,303,712, said application No. 14/251,446 is a continuation-in-part of application No. 13/934,067, filed on Jul. 2, 2013, now Pat. No. 10,060,499, which is a continuation-in-part of application No. 13/843,704, filed on Mar. 15, 2013, now Pat. No. 9,033,122, said application No. 14/251,446 is a continuation-in-part of application No. 13/485,401, filed on May 31, 2012, now abandoned, and a continuation-in-part of application No. 13/189,216, filed on Jul. 22, 2011, now Pat. No. 9,239,090, which is a continuation-in-part of application No. 13/175,244, filed on Jul. 1, 2011, now Pat. No. 8,627,932, and a continuation-in-part of application No. 13/010,697, filed on Jan. 20, 2011, now Pat. No. 8,857,580, said application No. 14/251,446 is a continuation-in-part of application No. 12/684,072, filed on Jan. 7, 2010, now abandoned, application No. 14/022,030, which is a continuation of application No. 12/463,927, filed on May 11, 2009, now Pat. No. 8,550,223.

(60) Provisional application No. 61/709,041, filed on Oct. 2, 2012, provisional application No. 61/667,327, filed on Jul. 2, 2012, provisional application No. 61/645,465, filed on May 10, 2012, provisional application No. 61/491,858, filed on May 31, 2011, provisional application No. 61/361,127, filed on Jul. 2, 2010, provisional application No. 61/296,826, filed on Jan. 20, 2010, provisional application No. 61/143,152, filed on Jan. 7, 2009, provisional application No. 61/052,150, filed on May 9, 2008.

(51) Int. Cl.

| *F16F 9/18* | (2006.01) |
|---|---|
| *F16F 9/32* | (2006.01) |
| *B60G 13/08* | (2006.01) |
| *B60G 17/08* | (2006.01) |
| *F16F 9/19* | (2006.01) |

(52) U.S. Cl.
CPC .............. *F16F 9/3214* (2013.01); *F16F 9/49* (2013.01); *B60G 2202/24* (2013.01); *B60G 2206/41* (2013.01); *B60G 2500/112* (2013.01); *B60G 2500/114* (2013.01); *F16F 9/19* (2013.01); *F16F 9/3242* (2013.01)

(58) Field of Classification Search
CPC ........ B60G 2500/112; B60G 2500/114; F16K 1/123; F16F 9/48; F16F 9/49; F16F 9/18; F16F 9/19; F16F 9/3242; F16F 9/3214
See application file for complete search history.

(56) References Cited

U.S. PATENT DOCUMENTS

| 1,307,502 A | 6/1919 | Martin |
|---|---|---|
| 1,409,849 A | 3/1922 | Haeberlein |
| 1,468,652 A | 9/1923 | Storey et al. |
| 1,492,731 A | 5/1924 | Kerr |
| 1,560,477 A | 11/1925 | Kessler |
| 1,571,788 A | 2/1926 | Bramlette, Jr. |
| 1,575,973 A | 3/1926 | Coleman |
| 1,655,786 A | 1/1928 | Guerritore et al. |
| 1,923,011 A | 8/1933 | Moulton |
| 1,948,600 A | 2/1934 | Templeton |
| 1,970,239 A | 8/1934 | Klaas |
| 2,018,312 A | 10/1935 | Moulton |
| 2,098,119 A | 11/1937 | White |
| 2,115,072 A | 4/1938 | Hunt et al. |
| 2,122,407 A | 7/1938 | Chisholm |
| 2,186,266 A | 1/1940 | Henry |
| 2,259,437 A | 10/1941 | Dean |
| 2,354,340 A | 7/1944 | Utter |
| 2,363,867 A | 11/1944 | Isely |
| 2,492,331 A | 12/1949 | Spring |
| 2,518,553 A | 8/1950 | Kieber |
| 2,540,525 A | 2/1951 | Howarth et al. |
| 2,559,633 A | 7/1951 | Maurice et al. |
| 2,588,520 A | 3/1952 | Halgren et al. |
| 2,697,600 A | 12/1954 | Gregoire |
| 2,705,119 A | 3/1955 | Ingwer |
| 2,725,076 A | 11/1955 | Hansen et al. |
| 2,729,308 A | 1/1956 | Koski et al. |
| 2,778,378 A | 1/1957 | Presnell |
| 2,784,962 A | 3/1957 | Sherburne |
| 2,809,722 A | 10/1957 | Smith |
| 2,838,140 A | 6/1958 | Rasmusson et al. |
| 2,846,028 A | 8/1958 | Gunther |
| 2,853,974 A | 9/1958 | Hewitt |
| 2,879,971 A | 3/1959 | Demay |
| 2,883,181 A | 4/1959 | Hogan et al. |
| 2,897,613 A | 8/1959 | Davidson et al. |
| 2,924,304 A | 2/1960 | Patriquin |
| 2,941,629 A | 6/1960 | Etienne et al. |
| 2,967,065 A | 1/1961 | Schwendner |
| 2,973,744 A | 3/1961 | Hennells |
| 2,991,804 A | 7/1961 | Merkle |
| 3,003,595 A | 10/1961 | Patriquin et al. |
| 3,056,598 A | 10/1962 | Sutton Ransom et al. |
| 3,073,586 A | 1/1963 | Hartel et al. |
| 3,074,709 A | 1/1963 | Ellis et al. |
| 3,085,530 A | 4/1963 | Williamson |
| 3,087,583 A | 4/1963 | Bruns |
| 3,107,753 A | 10/1963 | Georgette et al. |
| 3,127,958 A | 4/1964 | Szostak |
| 3,175,645 A | 3/1965 | Schafer et al. |
| 3,202,413 A | 8/1965 | Colmerauer |
| 3,206,153 A | 9/1965 | Burke |
| 3,238,850 A | 3/1966 | Desmarchelier |
| 3,284,076 A | 11/1966 | Gibson |
| 3,286,797 A | 11/1966 | Leibfritz et al. |
| 3,405,625 A | 10/1968 | Carlson et al. |
| 3,419,849 A | 12/1968 | Anderson et al. |
| 3,420,493 A | 1/1969 | Kraft et al. |
| 3,447,644 A | 6/1969 | Duckett |
| 3,494,606 A | 2/1970 | Hanchen |
| 3,528,700 A | 9/1970 | Janu et al. |
| 3,537,722 A | 11/1970 | Moulton |
| 3,556,137 A | 1/1971 | Billeter et al. |
| 3,559,027 A | 1/1971 | Arsem |
| 3,560,033 A | 2/1971 | Barkus |
| 3,575,442 A | 4/1971 | Elliott et al. |
| 3,584,331 A | 6/1971 | Richard et al. |
| 3,603,575 A | 9/1971 | Arlasky et al. |
| 3,605,960 A | 9/1971 | Singer |
| 3,618,972 A | 11/1971 | Buhl |
| 3,621,950 A | 11/1971 | Lutz |
| 3,650,033 A | 3/1972 | Behne et al. |
| 3,701,544 A | 10/1972 | Stankovich |
| 3,714,953 A | 2/1973 | Solvang |

(56) References Cited

U.S. PATENT DOCUMENTS

| | | |
|---|---|---|
| 3,750,856 A | 8/1973 | Kenworthy et al. |
| 3,784,228 A | 1/1974 | Hoffmann et al. |
| 3,791,408 A | 2/1974 | Saitou et al. |
| 3,792,644 A | 2/1974 | Ferguson et al. |
| 3,795,291 A | 3/1974 | Naito et al. |
| 3,830,482 A | 8/1974 | Norris |
| 3,842,753 A | 10/1974 | Ross et al. |
| 3,861,487 A | 1/1975 | Gill |
| 3,903,613 A | 9/1975 | Bisberg |
| 3,941,402 A | 3/1976 | Jankowski et al. |
| 3,974,910 A | 8/1976 | Papai |
| 3,981,204 A | 9/1976 | Starbard et al. |
| 3,981,479 A | 9/1976 | Foster et al. |
| 3,986,118 A | 10/1976 | Madigan |
| 3,995,883 A | 12/1976 | Glaze |
| 4,022,113 A | 5/1977 | Blatt et al. |
| 4,032,829 A | 6/1977 | Schenavar et al. |
| 4,036,335 A | 7/1977 | Thompson et al. |
| 4,045,008 A | 8/1977 | Bauer |
| 4,072,087 A | 2/1978 | Mueller et al. |
| 4,103,881 A | 8/1978 | Simich |
| 4,106,522 A | 8/1978 | Manesse |
| 4,114,735 A | 9/1978 | Kato |
| 4,121,610 A | 10/1978 | Harms et al. |
| 4,131,657 A | 12/1978 | Ball et al. |
| 4,139,186 A | 2/1979 | Postema et al. |
| 4,153,237 A * | 5/1979 | Supalla .............. B60G 17/04 188/266.8 |
| 4,159,106 A | 6/1979 | Nyman et al. |
| 4,166,612 A | 9/1979 | Freitag et al. |
| 4,174,098 A | 11/1979 | Baker et al. |
| 4,183,509 A | 1/1980 | Nishikawa et al. |
| 4,236,613 A | 12/1980 | Van Der Lely |
| 4,287,812 A | 9/1981 | Iizumi |
| 4,291,850 A | 9/1981 | Sharples |
| 4,305,566 A | 12/1981 | Grawunde |
| 4,311,302 A | 1/1982 | Heyer et al. |
| 4,333,668 A | 6/1982 | Hendrickson et al. |
| 4,334,711 A | 6/1982 | Mazur et al. |
| 4,337,850 A | 7/1982 | Shimokura et al. |
| 4,348,016 A | 9/1982 | Milly |
| 4,351,515 A | 9/1982 | Yoshida |
| 4,366,969 A | 1/1983 | Benya et al. |
| 4,387,781 A | 6/1983 | Ezell et al. |
| 4,437,548 A | 3/1984 | Ashiba et al. |
| 4,465,299 A | 8/1984 | Stone et al. |
| 4,474,363 A | 10/1984 | Numazawa et al. |
| 4,491,207 A | 1/1985 | Boonchanta et al. |
| 4,500,827 A | 2/1985 | Merritt et al. |
| 4,502,673 A | 3/1985 | Clark et al. |
| 4,529,180 A | 7/1985 | Hill |
| 4,546,959 A | 10/1985 | Tanno |
| 4,548,233 A | 10/1985 | Wolfges |
| 4,570,851 A | 2/1986 | Cirillo et al. |
| 4,572,317 A | 2/1986 | Isono et al. |
| 4,620,619 A | 11/1986 | Emura et al. |
| 4,624,346 A | 11/1986 | Katz et al. |
| 4,630,818 A | 12/1986 | Saarinen |
| 4,634,142 A | 1/1987 | Woods et al. |
| 4,647,068 A | 3/1987 | Asami et al. |
| 4,655,440 A | 4/1987 | Eckert |
| 4,657,280 A | 4/1987 | Ohmori et al. |
| 4,659,104 A | 4/1987 | Tanaka et al. |
| 4,660,689 A | 4/1987 | Hayashi et al. |
| 4,673,194 A | 6/1987 | Sugasawa |
| 4,696,489 A | 9/1987 | Fujishiro et al. |
| 4,709,779 A | 12/1987 | Takehara |
| 4,723,753 A * | 2/1988 | Torimoto .............. F16K 31/04 251/129.05 |
| 4,729,459 A | 3/1988 | Inagaki et al. |
| 4,732,244 A | 3/1988 | Verkuylen |
| 4,743,000 A | 5/1988 | Karnopp |
| 4,744,444 A | 5/1988 | Gillingham |
| 4,750,735 A | 6/1988 | Furgerson et al. |
| 4,765,648 A | 8/1988 | Mander et al. |
| 4,773,671 A | 9/1988 | Inagaki |
| 4,786,034 A | 11/1988 | Heess et al. |
| 4,806,082 A | 2/1989 | Schenk |
| 4,815,575 A | 3/1989 | Murty et al. |
| 4,821,852 A | 4/1989 | Yokoya |
| 4,826,207 A | 5/1989 | Yoshioka et al. |
| 4,830,395 A | 5/1989 | Foley |
| 4,836,578 A | 6/1989 | Soltis |
| 4,838,306 A | 6/1989 | Horn et al. |
| 4,838,394 A | 6/1989 | Lemme et al. |
| 4,846,317 A | 7/1989 | Hudgens |
| 4,858,733 A | 8/1989 | Noguchi et al. |
| 4,919,166 A | 4/1990 | Sims et al. |
| 4,936,423 A | 6/1990 | Karnopp |
| 4,936,424 A | 6/1990 | Costa |
| 4,938,228 A | 7/1990 | Righter |
| 4,949,262 A | 8/1990 | Buma et al. |
| 4,949,989 A | 8/1990 | Kakizaki et al. |
| 4,958,706 A | 9/1990 | Richardson et al. |
| 4,975,849 A | 12/1990 | Ema et al. |
| 4,984,819 A | 1/1991 | Kakizaki et al. |
| 4,986,393 A | 1/1991 | Preukschat et al. |
| 5,027,303 A | 6/1991 | Witte |
| 5,031,455 A | 7/1991 | Cline |
| 5,036,934 A | 8/1991 | Nishina et al. |
| 5,040,381 A | 8/1991 | Hazen |
| 5,044,614 A | 9/1991 | Rau |
| 5,060,910 A * | 10/1991 | Iwata .............. F16K 31/04 251/129.05 |
| 5,060,959 A | 10/1991 | Davis et al. |
| 5,072,812 A | 12/1991 | Imaizumi |
| 5,074,624 A | 12/1991 | Stauble et al. |
| 5,076,404 A | 12/1991 | Gustafsson |
| 5,080,392 A | 1/1992 | Bazergui |
| 5,094,325 A | 3/1992 | Smith |
| 5,105,918 A | 4/1992 | Hagiwara et al. |
| 5,113,980 A | 5/1992 | Furrer et al. |
| 5,152,547 A | 10/1992 | Davis |
| 5,161,653 A | 11/1992 | Hare |
| 5,163,742 A | 11/1992 | Topfer et al. |
| 5,178,242 A | 1/1993 | Nakamura et al. |
| 5,186,481 A | 2/1993 | Turner |
| 5,203,584 A | 4/1993 | Butsuen et al. |
| 5,207,774 A | 5/1993 | Wolfe et al. |
| 5,230,364 A | 7/1993 | Leng et al. |
| 5,231,583 A | 7/1993 | Lizell |
| 5,236,169 A | 8/1993 | Johnsen et al. |
| 5,246,247 A | 9/1993 | Runkel |
| 5,248,014 A | 9/1993 | Ashiba |
| 5,259,487 A | 11/1993 | Petek et al. |
| 5,263,559 A | 11/1993 | Mettner |
| 5,265,902 A | 11/1993 | Lewis |
| 5,275,086 A | 1/1994 | Stallings, Jr. |
| 5,277,283 A | 1/1994 | Yamaoka et al. |
| 5,283,733 A | 2/1994 | Colley |
| 5,284,330 A | 2/1994 | Carlson et al. |
| 5,293,971 A | 3/1994 | Kanari |
| 5,295,074 A | 3/1994 | Williams |
| 5,295,563 A | 3/1994 | Bennett |
| 5,297,045 A | 3/1994 | Williams et al. |
| 5,307,907 A | 5/1994 | Nakamura et al. |
| 5,311,709 A | 5/1994 | Kobori et al. |
| 5,318,066 A | 6/1994 | Burgorf et al. |
| 5,328,004 A | 7/1994 | Fannin et al. |
| 5,346,242 A | 9/1994 | Karnopp |
| 5,347,186 A | 9/1994 | Konotchick et al. |
| 5,348,112 A | 9/1994 | Vaillancourt |
| 5,372,223 A | 12/1994 | Dekock et al. |
| 5,372,224 A | 12/1994 | Samonil et al. |
| 5,381,952 A | 1/1995 | Duprez |
| 5,390,949 A | 2/1995 | Naganathan et al. |
| 5,392,885 A | 2/1995 | Patzenhauer et al. |
| 5,396,973 A | 3/1995 | Schwemmer et al. |
| 5,398,787 A | 3/1995 | Woessner et al. |
| 5,413,196 A | 5/1995 | Forster |
| 5,467,280 A | 11/1995 | Kimura |
| 5,480,011 A | 1/1996 | Nagai et al. |
| 5,485,417 A | 1/1996 | Wolf et al. |
| 5,487,006 A | 1/1996 | Kakizaki et al. |

(56) References Cited

U.S. PATENT DOCUMENTS

| | | | |
|---|---|---|---|
| 5,503,258 A | 4/1996 | Clarke et al. |
| 5,517,898 A | 5/1996 | Kim et al. |
| 5,542,150 A | 8/1996 | Tu |
| 5,551,674 A | 9/1996 | Johnsen |
| 5,553,836 A | 9/1996 | Ericson |
| 5,578,877 A | 11/1996 | Tiemann |
| 5,588,510 A | 12/1996 | Wilke |
| 5,592,401 A | 1/1997 | Kramer |
| 5,597,180 A | 1/1997 | Ganzel et al. |
| 5,598,337 A | 1/1997 | Butsuen et al. |
| 5,601,164 A | 2/1997 | Ohsaki et al. |
| 5,611,413 A | 3/1997 | Feigel |
| 5,634,563 A | 6/1997 | Peng |
| 5,651,433 A | 7/1997 | Wirth et al. |
| 5,657,840 A | 8/1997 | Lizell |
| 5,687,575 A | 11/1997 | Keville et al. |
| 5,697,477 A | 12/1997 | Hiramoto et al. |
| 5,699,885 A | 12/1997 | Forster |
| 5,722,645 A | 3/1998 | Reitter |
| 5,803,443 A | 9/1998 | Chang |
| 5,806,159 A | 9/1998 | Ohnishi et al. |
| 5,810,128 A | 9/1998 | Eriksson et al. |
| 5,810,384 A | 9/1998 | Iwasaki et al. |
| 5,813,456 A | 9/1998 | Milner et al. |
| 5,813,731 A | 9/1998 | Newman et al. |
| 5,816,281 A | 10/1998 | Mixon |
| 5,818,132 A | 10/1998 | Konotchick et al. |
| 5,826,935 A | 10/1998 | Defreitas et al. |
| 5,828,843 A | 10/1998 | Samuel et al. |
| 5,829,733 A | 11/1998 | Becker |
| 5,833,036 A | 11/1998 | Gillespie |
| 5,850,352 A | 12/1998 | Moezzi et al. |
| 5,850,896 A | 12/1998 | Tanaka |
| 5,853,071 A | 12/1998 | Robinson |
| 5,872,418 A | 2/1999 | Wischnewskiy |
| 5,884,921 A | 3/1999 | Katsuda et al. |
| 5,937,975 A | 8/1999 | Forster |
| 5,947,238 A | 9/1999 | Jolly et al. |
| 5,952,823 A | 9/1999 | Sprecher et al. |
| 5,954,318 A | 9/1999 | Kluhsman |
| 5,956,951 A | 9/1999 | O"Callaghan |
| 5,957,252 A | 9/1999 | Berthold |
| 5,971,116 A | 10/1999 | Franklin |
| 5,987,368 A | 11/1999 | Kamimae et al. |
| 5,988,330 A | 11/1999 | Morris |
| 5,988,655 A | 11/1999 | Sakai et al. |
| 5,992,450 A | 11/1999 | Parker et al. |
| 5,996,745 A | 12/1999 | Jones et al. |
| 5,996,746 A | 12/1999 | Turner et al. |
| 5,999,868 A | 12/1999 | Beno et al. |
| 6,000,702 A | 12/1999 | Streiter |
| 6,013,007 A | 1/2000 | Root et al. |
| 6,017,047 A | 1/2000 | Hoose |
| 6,029,958 A | 2/2000 | Larsson et al. |
| 6,035,979 A | 3/2000 | Forster |
| 6,050,583 A | 4/2000 | Bohn |
| 6,058,340 A | 5/2000 | Uchiyama et al. |
| 6,067,490 A | 5/2000 | Ichimaru et al. |
| 6,073,536 A | 6/2000 | Campbell |
| 6,073,700 A | 6/2000 | Tsuji et al. |
| 6,073,736 A | 6/2000 | Franklin |
| 6,092,011 A | 7/2000 | Hiramoto et al. |
| 6,092,816 A | 7/2000 | Sekine et al. |
| 6,105,988 A | 8/2000 | Turner et al. |
| 6,112,868 A | 9/2000 | Graham et al. |
| 6,120,049 A | 9/2000 | Gonzalez et al. |
| 6,131,709 A | 10/2000 | Jolly et al. |
| 6,135,434 A | 10/2000 | Marking |
| 6,141,969 A | 11/2000 | Launchbury et al. |
| 6,151,930 A | 11/2000 | Carlson |
| 6,152,856 A | 11/2000 | Studor et al. |
| 6,157,103 A * | 12/2000 | Ohta .................. F16K 31/04 |
| | | 310/49.47 |
| 6,179,098 B1 | 1/2001 | Hayakawa et al. |
| 6,196,555 B1 | 3/2001 | Gaibler |
| 6,199,669 B1 | 3/2001 | Huang et al. |
| 6,203,026 B1 | 3/2001 | Jones |
| 6,213,263 B1 | 4/2001 | De Frenne |
| 6,215,217 B1 | 4/2001 | Kurosawa et al. |
| 6,217,049 B1 | 4/2001 | Becker |
| 6,219,045 B1 | 4/2001 | Leahy et al. |
| 6,244,398 B1 | 6/2001 | Girvin et al. |
| 6,254,067 B1 | 7/2001 | Yih |
| 6,279,702 B1 | 8/2001 | Koh |
| 6,290,034 B1 | 9/2001 | Ichimaru |
| 6,293,530 B1 | 9/2001 | Delorenzis et al. |
| 6,296,092 B1 | 10/2001 | Marking et al. |
| 6,311,962 B1 | 11/2001 | Marking |
| 6,318,525 B1 | 11/2001 | Vignocchi et al. |
| 6,321,888 B1 | 11/2001 | Reybrouck et al. |
| 6,322,468 B1 | 11/2001 | Wing et al. |
| 6,336,648 B1 | 1/2002 | Bohn |
| 6,343,807 B1 | 2/2002 | Rathbun |
| 6,359,837 B1 | 3/2002 | Tsukamoto et al. |
| 6,360,857 B1 | 3/2002 | Fox et al. |
| 6,371,262 B1 | 4/2002 | Katou et al. |
| 6,371,267 B1 | 4/2002 | Kao et al. |
| 6,378,816 B1 | 4/2002 | Pfister |
| 6,378,885 B1 | 4/2002 | Ellsworth et al. |
| 6,382,370 B1 | 5/2002 | Girvin |
| 6,389,341 B1 | 5/2002 | Davis |
| 6,390,747 B1 | 5/2002 | Commins |
| 6,394,238 B1 | 5/2002 | Rogala |
| 6,401,883 B1 | 6/2002 | Nyce et al. |
| 6,412,788 B1 | 7/2002 | Ichimaru |
| 6,415,895 B2 | 7/2002 | Marking et al. |
| 6,418,360 B1 | 7/2002 | Spivey et al. |
| 6,427,812 B2 | 8/2002 | Crawley et al. |
| 6,434,460 B1 | 8/2002 | Uchino et al. |
| 6,446,771 B1 | 9/2002 | Sintorn et al. |
| 6,458,060 B1 | 10/2002 | Watterson et al. |
| 6,460,567 B1 * | 10/2002 | Hansen, III ............ F16K 31/04 |
| | | 137/554 |
| 6,467,593 B1 | 10/2002 | Corradini et al. |
| 6,474,454 B2 | 11/2002 | Matsumoto et al. |
| 6,474,753 B1 | 11/2002 | Rieth et al. |
| 6,501,554 B1 | 12/2002 | Hackney et al. |
| 6,502,837 B1 | 1/2003 | Hamilton et al. |
| 6,510,929 B1 | 1/2003 | Gordan et al. |
| 6,520,297 B1 | 2/2003 | Lumpkin et al. |
| 6,527,093 B2 | 3/2003 | Oliver et al. |
| 6,592,136 B2 | 7/2003 | Becker et al. |
| 6,609,686 B2 | 8/2003 | Malizia |
| 6,619,615 B1 | 9/2003 | Mayr et al. |
| 6,623,389 B1 | 9/2003 | Campagnolo |
| 6,648,109 B2 | 11/2003 | Farr et al. |
| 6,659,240 B2 | 12/2003 | Dernebo |
| 6,659,241 B2 | 12/2003 | Sendrea |
| 6,672,687 B2 | 1/2004 | Nishio |
| 6,701,234 B1 | 3/2004 | Vogelsang et al. |
| 6,732,033 B2 | 5/2004 | Laplante et al. |
| 6,755,113 B2 | 6/2004 | Shih |
| 6,782,980 B2 | 8/2004 | Nakadate |
| 6,817,454 B2 | 11/2004 | Nezu et al. |
| 6,837,827 B1 | 1/2005 | Lee et al. |
| 6,840,257 B2 | 1/2005 | Dario et al. |
| 6,853,955 B1 | 2/2005 | Burrell et al. |
| 6,857,625 B2 | 2/2005 | Löser et al. |
| 6,863,291 B2 | 3/2005 | Miyoshi |
| 6,902,513 B1 | 6/2005 | McClure et al. |
| 6,905,203 B2 | 6/2005 | Kremers et al. |
| 6,920,951 B2 | 7/2005 | Song et al. |
| 6,921,351 B1 | 7/2005 | Hickman et al. |
| 6,923,853 B2 | 8/2005 | Kremers et al. |
| 6,935,157 B2 | 8/2005 | Miller |
| 6,952,060 B2 | 10/2005 | Goldner et al. |
| 6,959,906 B2 | 11/2005 | Hoenig et al. |
| 6,959,921 B2 | 11/2005 | Rose |
| 6,966,412 B2 | 11/2005 | Braswell et al. |
| 6,978,871 B2 | 12/2005 | Holiviers |
| 6,978,872 B2 | 12/2005 | Turner |
| 6,991,076 B2 | 1/2006 | McAndrews |
| 7,025,367 B2 | 4/2006 | McKinnon et al. |
| 7,076,351 B2 | 7/2006 | Hamilton et al. |

(56) References Cited

U.S. PATENT DOCUMENTS

| | | |
|---|---|---|
| 7,128,192 B2 | 10/2006 | Fox |
| 7,128,693 B2 | 10/2006 | Brown et al. |
| 7,135,794 B2 | 11/2006 | Kühnel |
| 7,147,207 B2 | 12/2006 | Jordan et al. |
| 7,163,222 B2 | 1/2007 | Becker et al. |
| 7,166,062 B1 | 1/2007 | Watterson et al. |
| 7,166,064 B2 | 1/2007 | Ashby et al. |
| 7,204,466 B2 | 4/2007 | Hsieh |
| 7,208,845 B2 | 4/2007 | Schaefer et al. |
| 7,217,224 B2 | 5/2007 | Thomas |
| 7,234,574 B2 | 6/2007 | Matsunaga et al. |
| 7,234,575 B2 | 6/2007 | Anderfaas et al. |
| 7,234,680 B2 | 6/2007 | Hull et al. |
| 7,243,763 B2 | 7/2007 | Carlson |
| 7,255,210 B2 | 8/2007 | Larsson et al. |
| 7,270,221 B2 | 9/2007 | McAndrews |
| 7,270,222 B1 | 9/2007 | Aymar et al. |
| 7,287,760 B1 | 10/2007 | Quick et al. |
| 7,289,138 B2 | 10/2007 | Foote et al. |
| 7,292,867 B2 | 11/2007 | Werner et al. |
| 7,293,764 B2 | 11/2007 | Fang |
| 7,299,112 B2 | 11/2007 | Laplante et al. |
| 7,302,961 B2 | 12/2007 | Martin et al. |
| 7,306,206 B2 | 12/2007 | Turner |
| 7,316,406 B2 | 1/2008 | Kimura et al. |
| 7,325,660 B2 | 2/2008 | Norgaard et al. |
| 7,363,129 B1 | 4/2008 | Barnicle et al. |
| 7,374,028 B2 | 5/2008 | Fox |
| 7,397,355 B2 | 7/2008 | Tracy |
| 7,413,062 B2 | 8/2008 | Vandewal |
| 7,413,063 B1 | 8/2008 | Davis |
| 7,415,336 B1 | 8/2008 | Burch et al. |
| 7,422,092 B2 | 9/2008 | Hitchcock et al. |
| 7,441,638 B2 | 10/2008 | Hanawa |
| 7,469,910 B2 | 12/2008 | Münster et al. |
| 7,484,603 B2 | 2/2009 | Fox |
| 7,490,705 B2 | 2/2009 | Fox |
| 7,513,490 B2 | 4/2009 | Robertson |
| 7,523,617 B2 | 4/2009 | Colpitts et al. |
| 7,558,313 B2 | 7/2009 | Feher |
| 7,558,574 B2 | 7/2009 | Feher et al. |
| 7,566,290 B2 | 7/2009 | Lee et al. |
| 7,569,952 B1 | 8/2009 | Bono et al. |
| 7,581,743 B2 | 9/2009 | Graney et al. |
| 7,591,352 B2 | 9/2009 | Hanawa |
| 7,600,616 B2 | 10/2009 | Anderfaas et al. |
| 7,628,259 B2 | 12/2009 | Norgaard et al. |
| 7,631,882 B2 | 12/2009 | Hirao et al. |
| 7,654,369 B2 | 2/2010 | Murray et al. |
| 7,673,936 B2 | 3/2010 | Hsu et al. |
| 7,684,911 B2 | 3/2010 | Seifert et al. |
| 7,694,785 B2 | 4/2010 | Nakadate |
| 7,694,987 B2 | 4/2010 | McAndrews |
| 7,699,753 B2 | 4/2010 | Daikeler et al. |
| 7,703,585 B2 | 4/2010 | Fox |
| 7,722,056 B2 | 5/2010 | Inoue et al. |
| 7,722,069 B2 | 5/2010 | Shirai |
| 7,726,042 B2 | 6/2010 | Meschan |
| 7,730,906 B2 | 6/2010 | Kleinert et al. |
| 7,736,272 B2 | 6/2010 | Martens |
| 7,764,990 B2 | 7/2010 | Martikka et al. |
| 7,766,794 B2 | 8/2010 | Oliver et al. |
| 7,770,701 B1 | 8/2010 | Davis |
| 7,775,128 B2 | 8/2010 | Roessingh et al. |
| 7,779,974 B2 | 8/2010 | Timoney et al. |
| 7,795,711 B2 | 9/2010 | Sauciuc et al. |
| 7,837,213 B2 | 11/2010 | Colegrove et al. |
| 7,840,346 B2 | 11/2010 | Huhtala et al. |
| 7,841,258 B2 | 11/2010 | Komatsu et al. |
| 7,845,602 B1 | 12/2010 | Young et al. |
| 7,857,325 B2 | 12/2010 | Copsey et al. |
| 7,872,764 B2 | 1/2011 | Higgins-Luthman et al. |
| 7,874,567 B2 | 1/2011 | Ichida et al. |
| 7,901,292 B1 | 3/2011 | Uhlir et al. |
| 7,909,348 B2 | 3/2011 | Klieber et al. |
| 7,927,253 B2 | 4/2011 | Dibenedei et al. |
| 7,931,132 B2 | 4/2011 | Braun |
| 7,931,563 B2 | 4/2011 | Shaw et al. |
| 7,946,163 B2 | 5/2011 | Gartner |
| 7,975,814 B2 | 7/2011 | Soederdahl |
| 8,016,349 B2 | 9/2011 | Mouri et al. |
| 8,021,270 B2 | 9/2011 | D'Eredita |
| 8,042,427 B2 | 10/2011 | Kawakami et al. |
| 8,056,392 B2 | 11/2011 | Ryan et al. |
| 8,069,964 B2 | 12/2011 | Deferme et al. |
| 8,087,676 B2 | 1/2012 | McIntyre |
| 8,091,910 B2 | 1/2012 | Hara et al. |
| 8,104,591 B2 | 1/2012 | Barefoot et al. |
| 8,121,757 B2 | 2/2012 | Extance et al. |
| 8,127,900 B2 | 3/2012 | Inoue |
| 8,136,877 B2 | 3/2012 | Walsh et al. |
| 8,141,438 B2 | 3/2012 | Roessingh et al. |
| 8,151,952 B2 | 4/2012 | Lenz et al. |
| 8,191,964 B2 | 6/2012 | Hsu et al. |
| 8,201,476 B2 | 6/2012 | Tsumiyama |
| 8,210,106 B2 | 7/2012 | Tai et al. |
| 8,210,330 B2 | 7/2012 | Vandewal |
| 8,246,065 B1 | 8/2012 | Kodama et al. |
| 8,256,587 B2 | 9/2012 | Bakke et al. |
| 8,256,732 B1 | 9/2012 | Young et al. |
| 8,262,058 B2 | 9/2012 | Kot |
| 8,262,062 B2 | 9/2012 | Kamo et al. |
| 8,262,100 B2 | 9/2012 | Thomas |
| 8,265,825 B2 | 9/2012 | Kajino et al. |
| 8,285,447 B2 | 10/2012 | Bennett et al. |
| 8,286,982 B2 | 10/2012 | Plantet et al. |
| 8,291,889 B2 | 10/2012 | Shafer et al. |
| 8,292,274 B2 | 10/2012 | Adoline et al. |
| 8,307,965 B2 | 11/2012 | Föster et al. |
| 8,308,124 B2 | 11/2012 | Hsu |
| 8,317,261 B2 | 11/2012 | Walsh et al. |
| 8,328,454 B2 | 12/2012 | McAndrews et al. |
| 8,336,683 B2 | 12/2012 | McAndrews et al. |
| 8,393,446 B2 | 3/2013 | Haugen |
| 8,413,773 B2 | 4/2013 | Anderfaas et al. |
| 8,423,244 B2 | 4/2013 | Proemm et al. |
| 8,430,770 B2 | 4/2013 | Dugan et al. |
| 8,458,080 B2 | 6/2013 | Shirai |
| 8,480,064 B2 | 7/2013 | Talavasek |
| 8,550,223 B2 | 10/2013 | Cox et al. |
| 8,550,551 B2 | 10/2013 | Shirai |
| 8,556,048 B2 | 10/2013 | Maeda et al. |
| 8,556,049 B2 | 10/2013 | Jee |
| 8,596,663 B2 | 12/2013 | Shirai et al. |
| 8,616,351 B2 | 12/2013 | Roessle et al. |
| 8,622,180 B2 | 1/2014 | Wootten et al. |
| 8,627,932 B2 | 1/2014 | Marking |
| 8,641,073 B2 | 2/2014 | Lee et al. |
| 8,651,251 B2 | 2/2014 | Preukschat et al. |
| 8,655,548 B2 | 2/2014 | Ichida et al. |
| 8,727,947 B2 | 5/2014 | Tagliabue |
| 8,744,699 B2 | 6/2014 | Hamaguchi et al. |
| 8,752,682 B2 | 6/2014 | Park et al. |
| 8,763,770 B2 | 7/2014 | Marking |
| 8,770,357 B2 | 7/2014 | Sims et al. |
| 8,781,680 B2 | 7/2014 | Ichida et al. |
| 8,781,690 B2 | 7/2014 | Hara et al. |
| 8,814,109 B2 | 8/2014 | Calendrille et al. |
| 8,833,786 B2 | 9/2014 | Camp et al. |
| 8,838,335 B2 | 9/2014 | Bass et al. |
| 8,845,496 B2 | 9/2014 | Arrasvuori et al. |
| 8,857,580 B2 | 10/2014 | Marking |
| 8,868,253 B2 | 10/2014 | Hashimoto et al. |
| 8,888,115 B2 | 11/2014 | Chubbuck et al. |
| 8,935,036 B1 | 1/2015 | Christensen et al. |
| 8,936,139 B2 | 1/2015 | Galasso et al. |
| 8,950,771 B2 | 2/2015 | Felsl et al. |
| 8,955,653 B2 | 2/2015 | Marking |
| 8,967,343 B2 | 3/2015 | Battlogg et al. |
| 8,985,594 B2 | 3/2015 | Yabumoto |
| 8,991,571 B2 | 3/2015 | Murakami |
| 9,033,122 B2 | 5/2015 | Ericksen et al. |
| 9,038,791 B2 | 5/2015 | Marking |
| 9,047,778 B1 | 6/2015 | Cazanas et al. |

(56) References Cited

U.S. PATENT DOCUMENTS

| | | |
|---|---|---|
| 9,057,416 B2 | 6/2015 | Talavasek |
| 9,073,592 B2 | 7/2015 | Hsu |
| 9,103,400 B2 | 8/2015 | Becker |
| 9,108,098 B2 | 8/2015 | Galasso et al. |
| 9,120,362 B2 | 9/2015 | Marking |
| 9,126,647 B2 | 9/2015 | Kuo |
| 9,140,325 B2 | 9/2015 | Cox et al. |
| 9,157,523 B2 | 10/2015 | Miki et al. |
| 9,186,949 B2 | 11/2015 | Galasso et al. |
| 9,194,456 B2 | 11/2015 | Laird et al. |
| 9,199,690 B2 | 12/2015 | Watarai |
| 9,229,712 B2 | 1/2016 | Takamoto et al. |
| 9,239,090 B2 | 1/2016 | Marking et al. |
| 9,278,598 B2 | 3/2016 | Galasso et al. |
| 9,303,712 B2 | 4/2016 | Cox |
| 9,353,818 B2 | 5/2016 | Marking |
| 9,366,307 B2 | 6/2016 | Marking |
| 9,415,659 B2 | 8/2016 | Kikuchi et al. |
| 9,422,018 B2 | 8/2016 | Pelot et al. |
| 9,422,025 B2 | 8/2016 | Pezzi et al. |
| 9,452,654 B2 | 9/2016 | Ericksen et al. |
| 9,523,406 B2 | 12/2016 | Galasso et al. |
| 9,528,565 B2 | 12/2016 | Marking |
| 9,550,405 B2 | 1/2017 | Marking et al. |
| 9,556,925 B2 | 1/2017 | Marking |
| 9,616,728 B2 | 4/2017 | Marking |
| 9,650,094 B2 | 5/2017 | Laird et al. |
| 9,663,181 B2 | 5/2017 | Ericksen et al. |
| 9,682,604 B2 | 6/2017 | Cox et al. |
| 9,784,333 B2 | 10/2017 | Marking |
| 9,810,282 B2 | 11/2017 | Roessle et al. |
| 9,975,598 B2 | 5/2018 | Bender et al. |
| 10,036,443 B2 | 7/2018 | Galasso et al. |
| 10,040,328 B2 | 8/2018 | Marking |
| 10,040,329 B2 | 8/2018 | Ericksen et al. |
| 10,054,185 B2 | 8/2018 | Cox |
| 10,072,724 B2 | 9/2018 | Haugen et al. |
| 10,086,670 B2 | 10/2018 | Galasso et al. |
| 10,089,868 B1 | 10/2018 | Hayward |
| 10,094,443 B2 | 10/2018 | Marking |
| 10,330,171 B2 | 6/2019 | Cox et al. |
| 10,336,148 B2 | 7/2019 | Ericksen et al. |
| 10,336,149 B2 | 7/2019 | Ericksen et al. |
| 10,406,883 B2 | 9/2019 | Marking |
| 10,415,662 B2 | 9/2019 | Marking |
| 10,443,671 B2 | 10/2019 | Marking |
| 10,697,514 B2 | 6/2020 | Marking |
| 10,718,397 B2 | 7/2020 | Marking |
| 2001/0017334 A1 | 8/2001 | Vincent |
| 2001/0022621 A1 | 9/2001 | Squibbs |
| 2001/0030408 A1 | 10/2001 | Miyoshi et al. |
| 2001/0042663 A1 | 11/2001 | Marking et al. |
| 2001/0055373 A1 | 12/2001 | Yamashita |
| 2002/0000352 A1 | 1/2002 | Matsumoto et al. |
| 2002/0032508 A1 | 3/2002 | Uchino et al. |
| 2002/0045987 A1 | 4/2002 | Ohata et al. |
| 2002/0050112 A1 | 5/2002 | Koch et al. |
| 2002/0050518 A1 | 5/2002 | Roustaei |
| 2002/0053493 A1 | 5/2002 | Sintorn et al. |
| 2002/0055422 A1 | 5/2002 | Airmet et al. |
| 2002/0063469 A1 | 5/2002 | Nishio |
| 2002/0089107 A1 | 7/2002 | Koh |
| 2002/0095979 A1 | 7/2002 | Shirato et al. |
| 2002/0113347 A1 | 8/2002 | Robbins et al. |
| 2002/0121416 A1 | 9/2002 | Katayama et al. |
| 2002/0130000 A1 | 9/2002 | Lisenker et al. |
| 2002/0130003 A1 | 9/2002 | Lisenker et al. |
| 2002/0185581 A1 | 12/2002 | Trask et al. |
| 2002/0187867 A1 | 12/2002 | Ichida et al. |
| 2003/0001346 A1 | 1/2003 | Hamilton et al. |
| 2003/0001358 A1 | 1/2003 | Becker et al. |
| 2003/0034697 A1 | 2/2003 | Goldner et al. |
| 2003/0040348 A1 | 2/2003 | Martens et al. |
| 2003/0051954 A1 | 3/2003 | Sendrea |
| 2003/0054327 A1 | 3/2003 | Evensen et al. |
| 2003/0065430 A1 | 4/2003 | Lu et al. |
| 2003/0075403 A1 | 4/2003 | Dernebo |
| 2003/0103651 A1 | 6/2003 | Novak |
| 2003/0128275 A1 | 7/2003 | Maguire |
| 2003/0160369 A1 | 8/2003 | Laplante et al. |
| 2003/0216845 A1 | 11/2003 | Williston |
| 2004/0004659 A1 | 1/2004 | Foote et al. |
| 2004/0017455 A1 | 1/2004 | Kremers et al. |
| 2004/0021754 A1 | 2/2004 | Kremers et al. |
| 2004/0075350 A1 | 4/2004 | Kuhnel |
| 2004/0091111 A1 | 5/2004 | Levy et al. |
| 2004/0099312 A1 | 5/2004 | Boyer et al. |
| 2004/0103146 A1 | 5/2004 | Park |
| 2004/0172178 A1 | 9/2004 | Takeda et al. |
| 2004/0208687 A1 | 10/2004 | Sicz et al. |
| 2004/0220708 A1 | 11/2004 | Owen et al. |
| 2004/0220712 A1 | 11/2004 | Takeda et al. |
| 2004/0222056 A1 | 11/2004 | Fox |
| 2004/0256778 A1 | 12/2004 | Verriet |
| 2005/0055156 A1 | 3/2005 | Maltagliati et al. |
| 2005/0056507 A1 | 3/2005 | De Molina et al. |
| 2005/0077131 A1 | 4/2005 | Russell |
| 2005/0098401 A1 | 5/2005 | Hamilton et al. |
| 2005/0104320 A1 | 5/2005 | Wesling et al. |
| 2005/0107216 A1 | 5/2005 | Lee et al. |
| 2005/0110229 A1 | 5/2005 | Kimura et al. |
| 2005/0121269 A1 | 6/2005 | Namuduri |
| 2005/0173849 A1 | 8/2005 | Vandewal |
| 2005/0199455 A1 | 9/2005 | Browne et al. |
| 2005/0216186 A1 | 9/2005 | Dorfman et al. |
| 2005/0227798 A1 | 10/2005 | Ichida et al. |
| 2005/0239601 A1 | 10/2005 | Thomas |
| 2005/0288154 A1 | 12/2005 | Lee et al. |
| 2006/0040793 A1 | 2/2006 | Martens et al. |
| 2006/0064223 A1 | 3/2006 | Voss |
| 2006/0065496 A1 | 3/2006 | Fox |
| 2006/0066074 A1 | 3/2006 | Turner et al. |
| 2006/0076757 A1 | 4/2006 | Bromley |
| 2006/0081431 A1 | 4/2006 | Breese et al. |
| 2006/0096817 A1 | 5/2006 | Norgaard et al. |
| 2006/0113834 A1 | 6/2006 | Hanawa |
| 2006/0124414 A1 | 6/2006 | Hanawa |
| 2006/0136173 A1 | 6/2006 | Case et al. |
| 2006/0137934 A1 | 6/2006 | Kurth |
| 2006/0163551 A1 | 7/2006 | Coenen et al. |
| 2006/0163787 A1 | 7/2006 | Munster et al. |
| 2006/0175792 A1 | 8/2006 | Sicz et al. |
| 2006/0176216 A1 | 8/2006 | Hipskind |
| 2006/0185951 A1 | 8/2006 | Tanaka |
| 2006/0213082 A1 | 9/2006 | Meschan |
| 2006/0219503 A1 | 10/2006 | Kim |
| 2006/0225976 A1 | 10/2006 | Nakadate |
| 2006/0231359 A1 | 10/2006 | Matsunaga et al. |
| 2006/0237272 A1 | 10/2006 | Huang |
| 2006/0253210 A1 | 11/2006 | Rosenberg |
| 2006/0289258 A1 | 12/2006 | Fox |
| 2007/0006489 A1 | 1/2007 | Case et al. |
| 2007/0007743 A1 | 1/2007 | Becker et al. |
| 2007/0008096 A1 | 1/2007 | Tracy |
| 2007/0032981 A1 | 2/2007 | Merkel et al. |
| 2007/0034464 A1 | 2/2007 | Barefoot |
| 2007/0039790 A1 | 2/2007 | Timoney et al. |
| 2007/0051573 A1 | 3/2007 | Norgaard et al. |
| 2007/0070069 A1 | 3/2007 | Samarasekera et al. |
| 2007/0080515 A1 | 4/2007 | McAndrews et al. |
| 2007/0088475 A1 | 4/2007 | Nordgren et al. |
| 2007/0090518 A1 | 4/2007 | Sauciuc et al. |
| 2007/0119669 A1 | 5/2007 | Anderfaas et al. |
| 2007/0199401 A1 | 8/2007 | Kawakami et al. |
| 2007/0213126 A1 | 9/2007 | Deutsch et al. |
| 2007/0239479 A1 | 10/2007 | Arrasvuori et al. |
| 2007/0272458 A1 | 11/2007 | Taniguchi et al. |
| 2008/0006494 A1 | 1/2008 | Vandewal |
| 2008/0009992 A1 | 1/2008 | Izawa et al. |
| 2008/0015089 A1 | 1/2008 | Hurwitz et al. |
| 2008/0018065 A1 | 1/2008 | Hirao et al. |
| 2008/0029730 A1 | 2/2008 | Kamo et al. |
| 2008/0041677 A1 | 2/2008 | Namuduri |
| 2008/0059025 A1 | 3/2008 | Furuichi et al. |

(56) References Cited

U.S. PATENT DOCUMENTS

| | | |
|---|---|---|
| 2008/0067019 A1 | 3/2008 | Jensen et al. |
| 2008/0093820 A1 | 4/2008 | McAndrews |
| 2008/0096726 A1 | 4/2008 | Riley et al. |
| 2008/0099968 A1 | 5/2008 | Schroeder |
| 2008/0109158 A1 | 5/2008 | Huhtala et al. |
| 2008/0116622 A1 | 5/2008 | Fox |
| 2008/0119330 A1 | 5/2008 | Chiang et al. |
| 2008/0163718 A1 | 7/2008 | Chiang |
| 2008/0185244 A1 | 8/2008 | Maeda et al. |
| 2008/0200310 A1 | 8/2008 | Tagliabue |
| 2008/0250844 A1 | 10/2008 | Gartner |
| 2008/0254944 A1 | 10/2008 | Muri et al. |
| 2008/0303320 A1 | 12/2008 | Schranz et al. |
| 2008/0312799 A1 | 12/2008 | Miglioranza |
| 2008/0314706 A1 | 12/2008 | Lun et al. |
| 2009/0001684 A1 | 1/2009 | McAndrews et al. |
| 2009/0020382 A1 | 1/2009 | Van Weelden et al. |
| 2009/0038897 A1 | 2/2009 | Murakami |
| 2009/0048070 A1 | 2/2009 | Mncent et al. |
| 2009/0069972 A1 | 3/2009 | Templeton et al. |
| 2009/0070037 A1 | 3/2009 | Templeton et al. |
| 2009/0071772 A1 | 3/2009 | Cho et al. |
| 2009/0071773 A1 | 3/2009 | Lun |
| 2009/0098981 A1 | 4/2009 | Del et al. |
| 2009/0118100 A1 | 5/2009 | Oliver et al. |
| 2009/0121398 A1 | 5/2009 | Inoue |
| 2009/0131224 A1 | 5/2009 | Yuen |
| 2009/0138157 A1 | 5/2009 | Hagglund et al. |
| 2009/0171532 A1 | 7/2009 | Ryan et al. |
| 2009/0192673 A1 | 7/2009 | Song et al. |
| 2009/0200126 A1 | 8/2009 | Kondo et al. |
| 2009/0236807 A1 | 9/2009 | Wootten et al. |
| 2009/0258710 A1 | 10/2009 | Quatrochi et al. |
| 2009/0261542 A1 | 10/2009 | McIntyre |
| 2009/0277736 A1 | 11/2009 | McAndrews et al. |
| 2009/0288924 A1 | 11/2009 | Murray et al. |
| 2009/0294231 A1 | 12/2009 | Carlson et al. |
| 2009/0302558 A1 | 12/2009 | Shirai |
| 2009/0314592 A1 | 12/2009 | Nygren |
| 2009/0324327 A1 | 12/2009 | McAndrews et al. |
| 2010/0004097 A1 | 1/2010 | D'Eredita |
| 2010/0010709 A1 | 1/2010 | Song |
| 2010/0032254 A1 | 2/2010 | Anderfaas et al. |
| 2010/0044975 A1 | 2/2010 | Yablon et al. |
| 2010/0059964 A1 | 3/2010 | Morris |
| 2010/0066051 A1 | 3/2010 | Haugen |
| 2010/0109277 A1 | 5/2010 | Furrer |
| 2010/0133764 A1 | 6/2010 | Greaves |
| 2010/0139442 A1 | 6/2010 | Tsumiyama |
| 2010/0147640 A1 | 6/2010 | Jones et al. |
| 2010/0160014 A1 | 6/2010 | Galasso et al. |
| 2010/0170760 A1 | 7/2010 | Marking |
| 2010/0186836 A1 | 7/2010 | Yoshihiro et al. |
| 2010/0198453 A1 | 8/2010 | Dorogusker et al. |
| 2010/0207351 A1 | 8/2010 | Klieber et al. |
| 2010/0224454 A1 | 9/2010 | Chen et al. |
| 2010/0244340 A1 | 9/2010 | Wootten et al. |
| 2010/0252972 A1 | 10/2010 | Cox et al. |
| 2010/0276238 A1 | 11/2010 | Crasset |
| 2010/0276906 A1 | 11/2010 | Galasso et al. |
| 2010/0308628 A1 | 12/2010 | Hsu et al. |
| 2010/0314917 A1 | 12/2010 | Hsieh et al. |
| 2010/0327542 A1 | 12/2010 | Hara et al. |
| 2011/0067965 A1 | 3/2011 | McAndrews |
| 2011/0086686 A1 | 4/2011 | Avent et al. |
| 2011/0095507 A1 | 4/2011 | Plantet et al. |
| 2011/0097139 A1 | 4/2011 | Hsu et al. |
| 2011/0109060 A1 | 5/2011 | Earle et al. |
| 2011/0127706 A1 | 6/2011 | Sims et al. |
| 2011/0174582 A1 | 7/2011 | Wootten et al. |
| 2011/0202236 A1 | 8/2011 | Galasso et al. |
| 2011/0204201 A1 | 8/2011 | Kodama et al. |
| 2011/0214956 A1 | 9/2011 | Marking |
| 2011/0257848 A1 | 10/2011 | Shirai |
| 2011/0284333 A1 | 11/2011 | Krog et al. |
| 2011/0315494 A1 | 12/2011 | Marking |
| 2012/0006949 A1 | 1/2012 | Laird et al. |
| 2012/0007327 A1 | 1/2012 | Talavasek |
| 2012/0018263 A1 | 1/2012 | Marking |
| 2012/0018264 A1 | 1/2012 | King |
| 2012/0048665 A1 | 3/2012 | Marking |
| 2012/0074660 A1 | 3/2012 | Thomas |
| 2012/0080279 A1 | 4/2012 | Galasso et al. |
| 2012/0136537 A1 | 5/2012 | Galasso et al. |
| 2012/0181126 A1 | 7/2012 | De Kock |
| 2012/0222927 A1 | 9/2012 | Marking |
| 2012/0228906 A1 | 9/2012 | McAndrews et al. |
| 2012/0253599 A1 | 10/2012 | Shirai |
| 2012/0253600 A1 | 10/2012 | Ichida et al. |
| 2012/0274043 A1 | 11/2012 | Lee et al. |
| 2012/0305350 A1 | 12/2012 | Ericksen et al. |
| 2012/0312648 A1 | 12/2012 | Yu et al. |
| 2013/0001030 A1 | 1/2013 | Goldasz et al. |
| 2013/0037361 A1 | 2/2013 | Park et al. |
| 2013/0090195 A1 | 4/2013 | Yamaguchi et al. |
| 2013/0119634 A1 | 5/2013 | Camp et al. |
| 2013/0144489 A1 | 6/2013 | Galasso et al. |
| 2013/0168195 A1 | 7/2013 | Park et al. |
| 2013/0220110 A1 | 8/2013 | Zhan et al. |
| 2013/0221713 A1 | 8/2013 | Pelot et al. |
| 2013/0292218 A1 | 11/2013 | Ericksen et al. |
| 2013/0333993 A1 | 12/2013 | Yu |
| 2014/0008160 A1 | 1/2014 | Marking et al. |
| 2014/0027219 A1 | 1/2014 | Marking et al. |
| 2014/0048365 A1 | 2/2014 | Kim |
| 2014/0061419 A1 | 3/2014 | Wehage et al. |
| 2015/0073656 A1 | 3/2015 | Takamoto et al. |
| 2015/0081171 A1 | 3/2015 | Ericksen et al. |
| 2015/0175236 A1 | 6/2015 | Walthert et al. |
| 2015/0179062 A1 | 6/2015 | Ralston et al. |
| 2015/0197308 A1 | 7/2015 | Butora et al. |
| 2015/0291248 A1 | 10/2015 | Fukao et al. |
| 2016/0025178 A1 | 1/2016 | Kamakura et al. |
| 2016/0031506 A1 | 2/2016 | Lloyd et al. |
| 2016/0076617 A1 | 3/2016 | Marking |
| 2016/0153515 A1 | 6/2016 | Ebersbach et al. |
| 2016/0153516 A1 | 6/2016 | Marking |
| 2016/0185178 A1 | 6/2016 | Galasso et al. |
| 2016/0265615 A1 | 9/2016 | Marking |
| 2016/0290431 A1 | 10/2016 | Marking |
| 2016/0319899 A1 | 11/2016 | Franklin et al. |
| 2016/0355226 A1 | 12/2016 | Pelot et al. |
| 2017/0008363 A1 | 1/2017 | Ericksen et al. |
| 2017/0136843 A1 | 5/2017 | Marking |
| 2017/0184174 A1 | 6/2017 | Marking |
| 2017/0247072 A1 | 8/2017 | Laird et al. |
| 2017/0259876 A1 | 9/2017 | Ericksen et al. |
| 2017/0282669 A1 | 10/2017 | Cox et al. |
| 2017/0291466 A1 | 10/2017 | Tong |
| 2018/0010666 A1 | 1/2018 | Marking |
| 2018/0031071 A1 | 2/2018 | Marking |
| 2018/0326808 A1 | 11/2018 | Ericksen et al. |
| 2018/0328442 A1 | 11/2018 | Galasso et al. |
| 2018/0328446 A1 | 11/2018 | Ericksen et al. |
| 2018/0334007 A1 | 11/2018 | Ericksen et al. |
| 2018/0334008 A1 | 11/2018 | Ericksen et al. |
| 2018/0339565 A1 | 11/2018 | Ericksen et al. |
| 2018/0339566 A1 | 11/2018 | Ericksen et al. |
| 2018/0339567 A1 | 11/2018 | Ericksen et al. |
| 2018/0355943 A1 | 12/2018 | Cox |
| 2018/0355946 A1 | 12/2018 | Ericksen et al. |
| 2019/0030975 A1 | 1/2019 | Galasso et al. |
| 2019/0032745 A1 | 1/2019 | Marking |
| 2019/0154100 A1 | 5/2019 | Coaplen et al. |
| 2019/0176557 A1 | 6/2019 | Marking et al. |
| 2019/0184782 A1 | 6/2019 | Shaw et al. |

FOREIGN PATENT DOCUMENTS

| | | |
|---|---|---|
| DE | 3532292 A1 | 3/1987 |
| DE | 3536655 A1 | 4/1987 |
| DE | 3709447 A1 | 10/1988 |
| DE | 3711442 A1 | 10/1988 |
| DE | 3738048 A1 | 5/1989 |

(56) References Cited

FOREIGN PATENT DOCUMENTS

| | | |
|---|---|---|
| DE | 3924166 C1 | 2/1991 |
| DE | 4022099 C1 | 12/1991 |
| DE | 4029090 A1 | 3/1992 |
| DE | 4406918 A1 | 9/1994 |
| DE | 202004005229 U1 | 8/2004 |
| DE | 10326675 A1 | 12/2004 |
| DE | 102005025811 A1 | 12/2006 |
| DE | 102007063365 A1 | 7/2009 |
| DE | 202008015968 U1 | 4/2010 |
| DE | 202010012738 U1 | 12/2010 |
| EP | 207409 A2 | 1/1987 |
| EP | 304801 A2 | 3/1989 |
| EP | 0403803 A1 | 12/1990 |
| EP | 552568 A1 | 7/1993 |
| EP | 0735280 A2 | 10/1996 |
| EP | 1050696 A2 | 11/2000 |
| EP | 1138530 A2 | 10/2001 |
| EP | 1188661 A2 | 3/2002 |
| EP | 1241087 A1 | 9/2002 |
| EP | 1355209 A1 | 10/2003 |
| EP | 1394439 A1 | 3/2004 |
| EP | 1449688 A2 | 8/2004 |
| EP | 1623856 A2 | 2/2006 |
| EP | 1757473 A2 | 2/2007 |
| EP | 2103512 A2 | 9/2009 |
| EP | 2116739 A2 | 11/2009 |
| EP | 2248691 A1 | 11/2010 |
| EP | 2357098 A2 | 8/2011 |
| EP | 2410203 A2 | 1/2012 |
| EP | 2479095 A2 | 7/2012 |
| EP | 2495472 A2 | 9/2012 |
| EP | 2357098 B1 | 10/2014 |
| EP | 2848582 A1 | 3/2015 |
| EP | 3786049 A1 | 3/2021 |
| FR | 1343760 A | 11/1963 |
| FR | 2432424 A1 | 2/1980 |
| FR | 2449236 A1 | 9/1980 |
| FR | 2529002 A2 | 12/1983 |
| FR | 2617928 A1 | 1/1989 |
| FR | 2952031 A1 | 5/2011 |
| GB | 806307 A | 12/1958 |
| GB | 1185074 A | 3/1970 |
| GB | 2104183 A | 3/1983 |
| GB | 2159234 A | 11/1985 |
| GB | 2159604 A | 12/1985 |
| GB | 2180320 A | 3/1987 |
| GB | 2289111 A | 11/1995 |
| JP | 57173632 A | 10/1982 |
| JP | 57173632 U | 11/1982 |
| JP | 57182506 A | 11/1982 |
| JP | 01106721 A | 4/1989 |
| JP | H0193637 A | 4/1989 |
| JP | H02168038 A | 6/1990 |
| JP | H03113139 A | 5/1991 |
| JP | 04203540 A | 7/1992 |
| JP | 05149364 A | 6/1993 |
| JP | 06101735 A | 4/1994 |
| JP | 06185562 A | 7/1994 |
| JP | H084818 A | 1/1996 |
| JP | 2005119548 A | 5/2005 |
| JP | 2007302211 A | 11/2007 |
| JP | 2008238921 A | 10/2008 |
| KR | 20070076226 A | 7/2007 |
| KR | 20100041679 A | 4/2010 |
| RU | 2469224 C1 | 12/2012 |
| WO | 9840231 A2 | 9/1998 |
| WO | 99/06231 | 2/1999 |
| WO | 0027658 A1 | 5/2000 |
| WO | 03070546 A1 | 8/2003 |
| WO | 2007017739 A2 | 2/2007 |
| WO | 2007117884 A2 | 10/2007 |
| WO | 2008086605 A1 | 7/2008 |
| WO | 2008114445 A1 | 9/2008 |
| WO | 2013066159 A1 | 5/2013 |

OTHER PUBLICATIONS

"Notice of Intent to Grant EP Application 09159949.8 dated Nov. 14, 2019, pp. 48".
Electronic Translation of DE3709447A1.
English language abstract for EP 0207409 (no date).
Fachkunde Fahrradtechnik 4 Auflage, Gressmann_Inhaltv und S, 2011, 206-207.
Statement of Grounds of Appeal, EP App. No. 11153607.4, May 28, 2018, 88 Pages.
European Search Report, European Patent Application No. 14189773.6, dated May 4, 2015, 4 Pages.
Grounds of Appeal, EP App. No. 11153607.4, Jun. 1, 2018, 28 Pages.
EP Search Report for European Application No. 15163428.4, dated Jul. 3, 2017, 7 Pages.
"Communication Re Oral Proceedings for European Application No. 10161906, dated Feb. 15, 2013 (Feb. 15, 2013)".
"European Patent Office Final Decision dated Mar. 21, 2013", European Patent Application No. 10161906.2.
"European Search Report for European Application No. 09159949, 2 pages, dated Sep. 11, 2017 (Sep. 11, 2017)".
"European Search Report for European Application No. 09177128, 4 pages, dated Aug. 25, 2010 (Aug. 25, 2010)".
"European Search Report for European Application No. 10161906 , 3 pages, dated Sep. 15, 2010 (Sep. 15, 2010)".
"European Search Report for European Application No. 10187320, 12 pages, dated Sep. 25, 2017 (Sep. 25, 2017)".
"European Search Report for European Application No. 11153607, 3 pages, dated Aug. 10, 2012 (Aug. 10, 2012))".
"European Search Report for European Application No. 11172553, 2 pages, dated Sep. 25, 2017 (Sep. 25, 2017)".
"European Search Report for European Application No. 11172612, 2 pages, dated Oct. 6, 2011 (Oct. 6, 2011))".
"European Search Report for European Application No. 11175126, 2 pages, dated Sep. 25, 2017 (Sep. 25, 2017)".
"European Search Report for European Application No. 11275170 , 2 pages, dated Jan. 10, 2018 (Jan. 10, 2018)".
"European Search Report for European Application No. 12170370 , 2 pages, dated Nov. 15, 2017 (Nov. 15, 2017)".
"European Search Report for European Application No. 12184150, 10 pages, dated Dec. 12, 2017 (Dec. 12, 2017)".
"European Search Report for European Application No. 13158034 , 4 pages, dated Jun. 28, 2013 (Jun. 28, 2013))".
"European Search Report for European Application No. 13174817.0, 13 pages, dated Jan. 8, 2018 (Jan. 8, 2018))".
"European Search Report for European Application No. 13189574, 2 pages, dated Feb. 19, 2014 (Feb. 19, 2014)".
"European Search Report for European Application No. 15167426, 4 pages, dated Sep. 18, 2015 (Sep. 18, 2015))".
"European Search Report for European Application No. 16167306 , 2 pages, dated Mar. 23, 2017 (Mar. 23, 2017)".
"European Search Report for European Application No. 17154191, 2 pages, dated Jun. 28, 2017 (Jun. 28, 2017)".
"European Search Report for European Application No. 17188022, 9 pages, dated Feb. 1, 2018 (Feb. 1, 2018))".
"European Search Report and Written Opinion, European Patent Application No. 13165362.8", dated Sep. 24, 2014, 6 Pages.
"Office Action for European Application No. 13158034.2, 5 pages, dated May 22, 2014".
"The Lee Company Technical Hydraulic Handbook", 1996, 1-696.
Healey, "The Tyre as Part of the Suspension System", The Institution of Automobile Engineers, Nov. 1924, 26-128.
Kasprzak, "Understanding Your Dampers: A guide from Jim Kasprzak", http://www.kaztechnologies.com/downloads/kaz-tech-tips/ Accessed: Oct. 24, 2018, 25 pages.
Litchfield, "Pneumatic Tires", Transactions (Society of Automobile Engineers), vol. 8, Part II, 1913, 208-223.
Nilsson, "Opposition Letter Against EP-2357098", Oct. 13, 2017, 7.
Puhn, "How To Make Your Car Handle", HPBooks, 1981, 7 Pages.

(56) References Cited

OTHER PUBLICATIONS

Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.
Smith, ""The Bump Stop" in Engineer to win—Chapter 13: Springs and Shock Absorbers", MBI Publishing Company and Motorbooks, USA XP055430818, ISBN: 978-0-87938-186-8, Dec. 31, 1984, 207.
Thum, "Oppostion Letter Against EP2357098", Oct. 16, 2018, 39.
Waechter, et al., "A Multibody Model for the Simulation of Bicycle Suspension Systems", Vehicle System Dynamics, vol. 37, No. 1, 2002, 3-28.
European Search Report for European Application No. 19206334.5, 6 pages, dated May 12, 2020 (May 12, 2020).
European Search Report for European Application No. 19212356.0, 8 pages, May 7, 2020 (May 7, 2020).
Machine translation DE3613386; Oct. 1986.
Machine translation EP 0403803; Dec. 1990.
Machine translation KR20100041679; Apr. 2010.
European Search Report for European Application No. 20154392.3, 7 pages, dated Jul. 2, 2020 (Jul. 2, 2020).
Thum, "Oppostion Letter Against EP2357098", Dec. 17, 2019, 25 Pages.
European Search Report for European Application No. 20187747, dated Nov. 18, 2020, 11 Pages.

* cited by examiner

POSITION SENSITIVE SUSPENSION DAMPING WITH AN ACTIVE VALVE

CROSS-REFERENCE TO RELATED APPLICATIONS

This application claims priority to and is a continuation-in-part of the patent application Ser. No. 16/105,639, entitled "METHODS AND APPARATUS FOR POSITION SENSITIVE SUSPENSION DAMPING," with filing date Aug. 20, 2018, by Christopher Paul Cox, which is incorporated herein, in its entirety, by reference.

The application with Ser. No. 16/105,639 claims priority to and is a continuation of the patent application Ser. No. 15/056,940, now Issued U.S. Pat. No. 10,054,185, entitled "METHODS AND APPARATUS FOR POSITION SENSITIVE SUSPENSION DAMPING," with filing date Feb. 29, 2016, by Christopher Paul Cox, which is incorporated herein, in its entirety, by reference.

The application with Ser. No. 15/056,940 claims priority to and is a continuation of the patent application Ser. No. 14/022,030, now Issued U.S. Pat. No. 9,303,712, entitled "METHODS AND APPARATUS FOR POSITION SENSITIVE SUSPENSION DAMPING," with filing date Sep. 9, 2013, by Christopher Paul Cox, which is incorporated herein, in its entirety, by reference.

The application with Ser. No. 14/022,030 claims priority to and is a continuation of the patent application Ser. No. 12/463,927, now Issued U.S. Pat. No. 8,550,223, entitled "METHODS AND APPARATUS FOR POSITION SENSITIVE SUSPENSION DAMPING," with filing date May 11, 2009, by Christopher Paul Cox, which is incorporated herein, in its entirety, by reference.

The application with Ser. No. 12/463,927 claims priority to the patent application, Ser. No. 61/052,150, entitled "METHODS AND APPARATUS FOR POSITION SENSITIVE SUSPENSION DAMPING," with filing date May 9, 2008, by Christopher Paul Cox, which is incorporated herein, in its entirety, by reference.

This application is a continuation-in-part application of and claims the benefit of U.S. patent application Ser. No. 16/042,563, filed on Jul. 23, 2018, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 16/042,563 is a continuation application of and claims the benefit of U.S. patent application Ser. No. 15/275,078, now Issued U.S. Pat. No. 10,040,329, filed on Sep. 23, 2016, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 15/275,078 is a divisional application of and claims the benefit of U.S. patent application Ser. No. 14/466,831, now Issued U.S. Pat. No. 9,452,654, filed on Aug. 22, 2014, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 14/466,831 is a continuation-in-part application of and claims the benefit of U.S. patent application Ser. No. 14/251,446, filed on Apr. 11, 2014, now Issued U.S. Pat. No. 10,047,817, entitled "METHOD AND APPARATUS FOR ADJUSTABLE DAMPER" by Ericksen et al., assigned to the assignee of the present application, and is hereby incorporated by reference in its entirety herein.

The U.S. patent application Ser. No. 14/251,446 is a continuation-in-part application of and claims the benefit of U.S. patent application Ser. No. 13/934,067, filed on Jul. 2, 2013, now Issued U.S. Pat. No. 10,060,499, entitled "METHOD AND APPARATUS FOR ADJUSTABLE DAMPER" by Ericksen et al., assigned to the assignee of the present application, and is hereby incorporated by reference in its entirety herein.

The application with Ser. No. 13/934,067 is a continuation-in-part application of and claims the benefit of U.S. patent application Ser. No. 13/843,704, now Issued U.S. Pat. No. 9,033,122, filed on Mar. 15, 2013, entitled "METHOD AND APPARATUS FOR ADJUSTABLE DAMPER" by Ericksen et al., assigned to the assignee of the present application, and is hereby incorporated by reference in its entirety herein.

The application with Ser. No. 13/843,704, claims the benefit of and claims priority of U.S. provisional patent application Ser. No. 61/709,041, filed on Oct. 2, 2012, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 13/843,704, claims priority of U.S. provisional patent application Ser. No. 61/667,327, filed on Jul. 2, 2012, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 14/251,446 is a continuation-in-part application of and claims the benefit of U.S. patent application Ser. No. 13/485,401, now Abandoned, filed on May 31, 2012, entitled "METHODS AND APPARATUS FOR POSITION SENSITIVE SUSPENSION DAMPING" by Ericksen et al., assigned to the assignee of the present application, and is hereby incorporated by reference in its entirety herein.

The application with Ser. No. 13/485,401 claims the benefit of and claims priority of U.S. provisional patent application Ser. No. 61/491,858, filed on May 31, 2011, entitled "METHODS AND APPARATUS FOR POSITION SENSITVE SUSPENSION DAMPENING" by Ericksen et al., assigned to the assignee of the present application, and is hereby incorporated by reference in its entirety herein.

The application with Ser. No. 13/485,401 claims the benefit of and claims priority of U.S. provisional patent application Ser. No. 61/645,465, filed on May 10, 2012, entitled "METHOD AND APPARATUS FOR AN ADJUSTABLE DAMPER" by Cox et al., assigned to the assignee of the present application, and is hereby incorporated by reference in its entirety herein.

The application with Ser. No. 14/251,446 is a continuation-in-part application of and claims the benefit of U.S. patent application Ser. No. 12/684,072, now Abandoned, filed on Jan. 7, 2010, entitled "REMOTELY OPERATED BYPASS FOR A SUSPENSION DAMPER" by John Marking, assigned to the assignee of the present application, and is hereby incorporated by reference in its entirety herein.

The application with Ser. No. 12/684,072 claims the benefit of and claims priority of U.S. provisional patent application Ser. No. 61/143,152, filed on Jan. 7, 2009, entitled "REMOTE BYPASS LOCK-OUT" by John Marking, assigned to the assignee of the present application, and is hereby incorporated by reference in its entirety herein.

The application with Ser. No. 14/251,446 is a continuation-in-part application of and claims the benefit of U.S. patent application Ser. No. 13/189,216, now Issued U.S. Pat. No. 9,239,090, filed on Jul. 22, 2011, entitled "SUSPENSION DAMPER WITH REMOTELY-OPERABLE VALVE" by John Marking, assigned to the assignee of the present application, and is hereby incorporated by reference in its entirety herein.

The application with Ser. No. 13/189,216 is a continuation-in-part application of and claims the benefit of U.S. patent application Ser. No. 13/010,697, now Issued U.S. Pat. No. 8,857,580, filed on Jan. 20, 2011, entitled "REMOTELY OPERATED BYPASS FOR A SUSPENSION DAMPER" by John Marking, assigned to the assignee of the present application, and is hereby incorporated by reference in its entirety herein.

The application with Ser. No. 13/010,697 claims the benefit of and claims priority of U.S. provisional patent application Ser. No. 61/296,826, filed on Jan. 20, 2010, entitled "BYPASS LOCK-OUT VALVE FOR A SUSPENSION DAMPER" by John Marking, assigned to the assignee of the present application, and is hereby incorporated by reference in its entirety herein.

The application with Ser. No. 13/189,216 is a continuation-in-part application of and claims the benefit of U.S. patent application Ser. No. 13/175,244, now Issued U.S. Pat. No. 8,627,932, filed on Jul. 1, 2011, entitled "BYPASS FOR A SUSPENSION DAMPER" by John Marking, assigned to the assignee of the present application, and is hereby incorporated by reference in its entirety herein.

The application with Ser. No. 13/175,244 claims the benefit of and claims priority of U.S. provisional patent application Ser. No. 61/361,127, filed on Jul. 2, 2010, entitled "BYPASS LOCK-OUT VALVE FOR A SUSPENSION DAMPER" by John Marking, assigned to the assignee of the present application, and is hereby incorporated by reference in its entirety herein.

FIELD OF THE INVENTION

Embodiments of the invention generally relate to methods and apparatus for use in vehicle suspension. Particular embodiments of the invention relate to methods and apparatus useful for variable and position sensitive dampening rate in vehicle shock absorbers.

BACKGROUND OF THE INVENTION

Vehicle suspension systems typically include a spring component or components and a dampening component or components. Typically, mechanical springs, such as helical springs are used with some type of viscous fluid-based dampening mechanism and the two are mounted functionally in parallel. FIG. 1 is a perspective view of a shock absorber 100, typically used as a rear shock absorber for a motorcycle and fixable at an upper end with a mounting eye 105 to a main frame of a cycle and at a lower end with another mounting eye 110 to a link system beneath a swinging arm. The link system (not shown) is designed to leverage the suspension so that initially the suspension feels soft but feels progressively firmer as the shock absorber is compressed further. The shock absorber of FIG. 1 includes a helical spring 115, a damper housing 120 with a piston and chamber (not shown) and an external reservoir 125 having a floating piston (not shown) and pressurized gas to compensate for a reduction in volume in the main damper chamber of the shock absorber as the piston shaft 130 moves into the damper body. Fluid communication between the main chamber of the damper and the external reservoir 125 may be via a flow channel including an adjustable needle valve. In its basic form, the damper works in conjunction with the helical spring and controls the speed of movement of the piston shaft by metering incompressible fluid from one side of the damper piston to the other, and additionally from the main chamber to the reservoir, during a compression stroke (and in reverse during the rebound or extension stroke).

Various refinements have been made to shock absorbers like the one shown in FIG. 1 to enhance theft performance. One continuing problem is that of a "bottom out" condition where the dampening piston becomes completely retracted due to compressive forces brought about by terrain and the weight of a rider. Additionally problematic is the fact that the dampening fluid typically increases in temperature during use. A "bottom out" dampener that may be initially set up to be effective at higher dampening fluid temperature will often be too stiff at lower temperatures during initial stages of use (noting that the shock fluid temperature may never even rise to an ideal temperature) creating a harsh ride and poor vehicle handling characteristics. A dampener that works well and initially doesn't bottom out too hard may begin to bottom out as the dampening fluid becomes heated and correspondingly less viscous during use or extended use.

To avoid bottom out, various means have been utilized to increase dampening in a position-sensitive manner whereby the dampening increases as the piston nears the end of a compressive stroke. In one example, illustrated in U.S. Pat. No. 6,446,771 (which patent is incorporated by reference herein in its entirety), a shock absorber includes an additional piston located at an end of the piston shaft and designed to enter a completely closed cup-shaped member as the shock absorber approaches complete compression. The arrangement adds an additional fluid metering dampening piston and therefore additional dampening, as the shock nears the end of its stroke.

U.S. Pat. No. 6,029,958, which is also incorporated by reference herein in its entirety, provides an increase in dampening as the shock is compressed by using a pin and hole arrangement. As illustrated in FIG. 1 of the '958 patent, the piston has an aperture formed in its center and the aperture serves as a fluid path during a first portion of the shock's compression stroke. As the piston moves nearer the bottom out position, a pin mounted at a bottom end of the damper chamber contacts the aperture and prevents further fluid communication. In this manner, dampening is increased by eliminating a metering path for the fluid.

While the forging patents teach structures for increasing dampening in the final stages of a shock absorber's compression stroke, none provide a complete and automatically adjustable system through the use of an active valve secondary dampening arrangement. None of the foregoing teachings suggest any way that bottom out dampening features can be readily adjusted during a ride or "on the fly" so to state. What is needed is a dampening system that will prevent or mitigate "bottom out" and that can be adjusted as a ride, and corresponding use of the shock absorber, progresses. What is needed is a bottom out mitigation system that can be adjusted to account for dampening fluid temperature changes during use. What is needed is a readily accessible and active valve secondary dampening arrangement and method for its use.

SUMMARY OF THE INVENTION

Embodiments of the invention are generally related to methods and apparatus for use in vehicle suspension. Particular embodiments relate to methods and apparatus useful in position sensitive dampening in a shock absorber for a motorcycle. In one aspect, a fluid damper is provided comprising a damper chamber divided by a piston into a primary compression and a primary rebound chamber. A secondary compression chamber is in fluid communication with the damper chamber and an adjustable fluid meter controls fluid flow out of the secondary compression chamber. In another embodiment, a bottom out cup is provided at a lower end of a damper chamber for operation in conjunction with a bottom out piston. As the bottom out piston enters and seals the cup, increased dampening takes place as the path of fluid from the cup back into the compression chamber of the shock is limited, in one embodiment, to a blow-off valve and/or an active valve. In another embodiment, communication is selectively permitted between fluid in the sealed bottom out cup and the rebound portion of the damper chamber via a fluid path(s) formed in the interior of the piston shaft. In one embodiment, the fluid path in the piston shaft is controlled with a reversible check valve that will permit, in one setting, fluid communication only during the rebound stoke of the piston and shaft.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

In the following discussion, the term "active" means adjustable, electronic, manipulatable, etc. while "passive" means fixed or not changeable. Thus, an active valve is a valve which automatically adjusts itself based on characteristics of the vehicle, the suspension, received user input, or the like, in which the valve is used.

Figure 1:
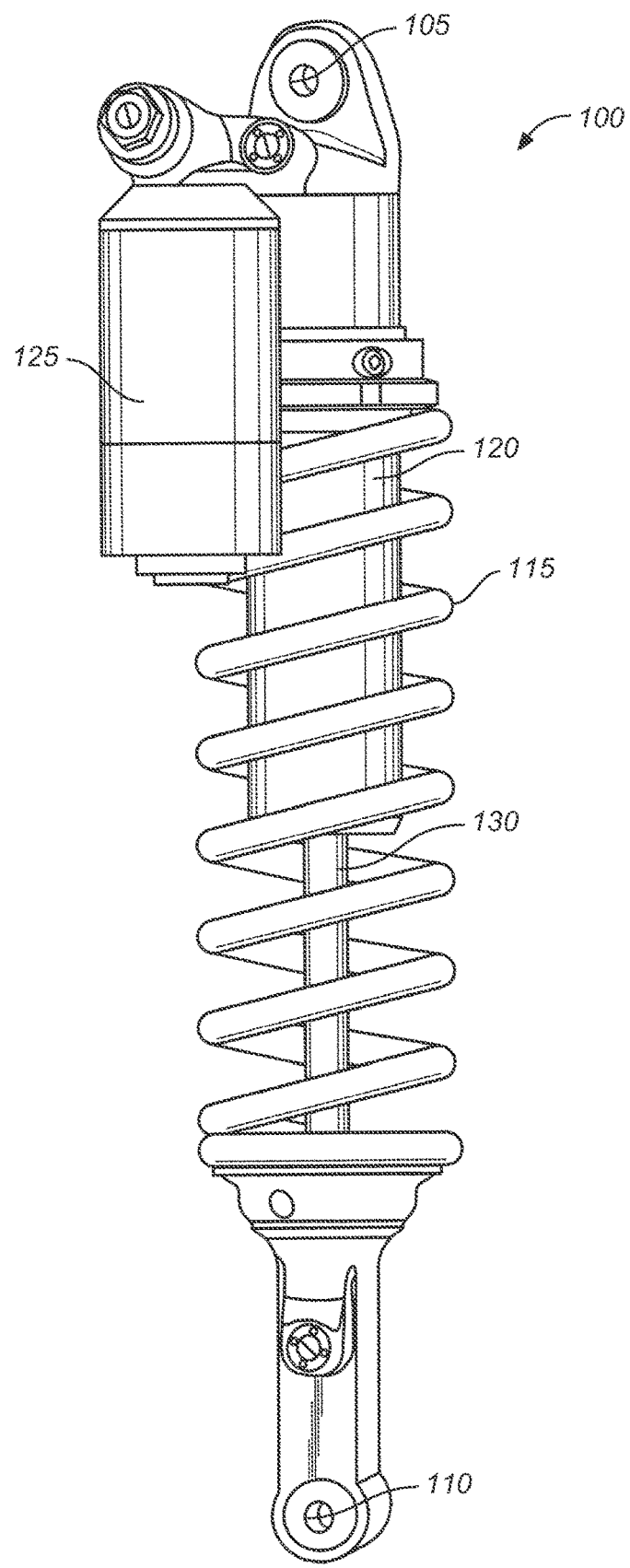
FIG. 1 is a perspective view of a rear shock absorber including a damper, external reservoir and helical spring.
Figure 2:
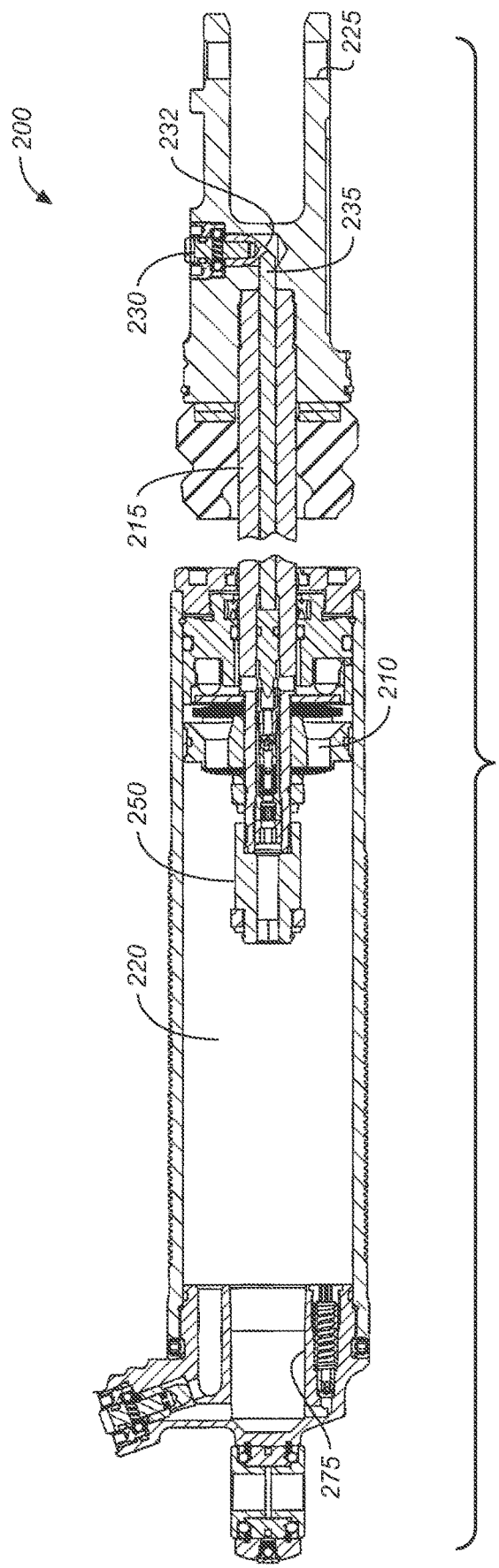
FIG. 2 is a section view showing a shock absorber with a dampening assembly having a secondary, bottom out dampening assembly.

FIG. 2 is a section view showing a dampening assembly 200 of a shock absorber shown in an axially extended position. A dampening piston 210 is fixed relative to a shaft 215, both of which are axially movable relative to a housing or chamber 220. The piston 210 is equipped with fluid paths therethrough to permit dampening fluid within the chamber 220 to be metered through the piston 210. For example, when the shaft 215 moves into the chamber 220, fluid moves from a first side (the compression portion) to an opposite side (the rebound portion) of the chamber 220 through the paths formed in the piston 210. Additionally, fluid must move through a flow path from the chamber 220 into the external reservoir 125, thereby causing a reservoir floating piston to compress a gas chamber in the external reservoir 125. A configuration of a side reservoir, including a floating piston, is described in U.S. Pat. No. 7,374,028 which patent is entirely incorporated herein by reference.

Also visible in FIG. 2 is a bottom out control feature. In one embodiment, the bottom out control feature utilizes a bottom out piston 250 connected at the end of the shaft 215 and spaced from the dampening piston 210. The bottom out piston is constructed and arranged to engage a bottom out cup 275 formed at the lower end of the chamber 220. As will be explained herein in more detail, the bottom out cup and bottom out piston operate with various dampening devices including a pressure relief or "blow-off" valve and an active valve to provide bottom out control.

However, various bottom out control features (both similar to the bottom out cup described herein, and using other bottom out control layouts, parts, systems, etc.) have been utilized in different shock set-ups such as those discussed in mountain bike forums, shock setup forums, and patents including U.S. Pat. No. 8,550,223 which is incorporated herein by reference in its entirety. However, the utilization of an active valve 350 to control any type of fluid flow pathways in a bottom out control feature has not been implemented prior to this disclosure. Moreover, the active valve 350, although described herein in a method of operation and design is not limited to the embodiment of a bottom out control feature using a bottom out cup, but could be easily added to any fluid flow pathway(s) that are a part of a bottom out control feature, system, or setup.

Example Active Bottom Out Valve

The active valve 350, in accordance with embodiments, includes a nipple 370, a body 355, and mating threads 390. In brief, body 355 is rotationally engaged with the nipple 370. A male hex member extends from an end of the body 355 into a female hex profile bore formed in the nipple 370. Such engagement transmits rotation from the body 355 to the nipple 370 while allowing axial displacement of the nipple 370 relative to the body 355. Therefore, while the body does not axially move upon rotation, the threaded nipple 370 interacts with mating threads 390 formed on an inside diameter of the bore to transmit axial motion, resulting from rotation and based on the pitch of the threads 390, of the nipple 370 towards and away from an orifice 400 and between a closed and fully open positions. Of note, depending on the movement of the body 355, the nipple 370 may occupy a position within respect to orifice 400 such that nipple 370 completely blocks orifice 400, partially blocks orifice 400, or does not block orifice 400 at all.

For example, active valve 350, when open, permits a first flow rate of the working fluid through orifice 400. In contrast, when active valve 350 is partially closed, a second flow rate of the working fluid though orifice 400 occurs. The second flow rate is less than the first flow rate but greater than no flow rate. When active valve 350 is completely closed, the flow rate of the working fluid though orifice 400 is statistically zero.

In one embodiment, instead of (or in addition to) restricting the flow through orifice 400, active valve 350 can vary a flow rate through an inlet or outlet passage within the active valve 350, itself. See, as an example, the electronic valve of FIGS. 2-4 of U.S. Pat. No. 9,353,818 which is incorporated by reference herein, in its entirety, as further example of different types of "electronic" or "active" valves). Thus, the active valve 350, can be used to meter the working fluid flow (e.g., control the rate of working fluid flow) with/or without adjusting the flow rate through orifice 400.

As can be seen in FIGS. 2-4D, due to the active valve 350 (or 450) arrangement, a relatively small solenoid (using relatively low amounts of power) can generate relatively large damping forces. Furthermore, due to incompressible fluid inside the dampening assembly 200, damping occurs as the distance between nipple 370 and orifice 400 is reduced. The result is a controllable damping rate. Certain active valve features are described and shown in U.S. Pat. Nos. 9,120,362; 8,627,932; 8,857,580; 9,033,122; and 9,239,090 which are incorporated herein, in their entirety, by reference.

It should be appreciated that when the body 355 rotates in a reverse direction than that described above and herein, the nipple 370 moves away from orifice 490 providing at least a partially opened fluid path.

Figure 3A:
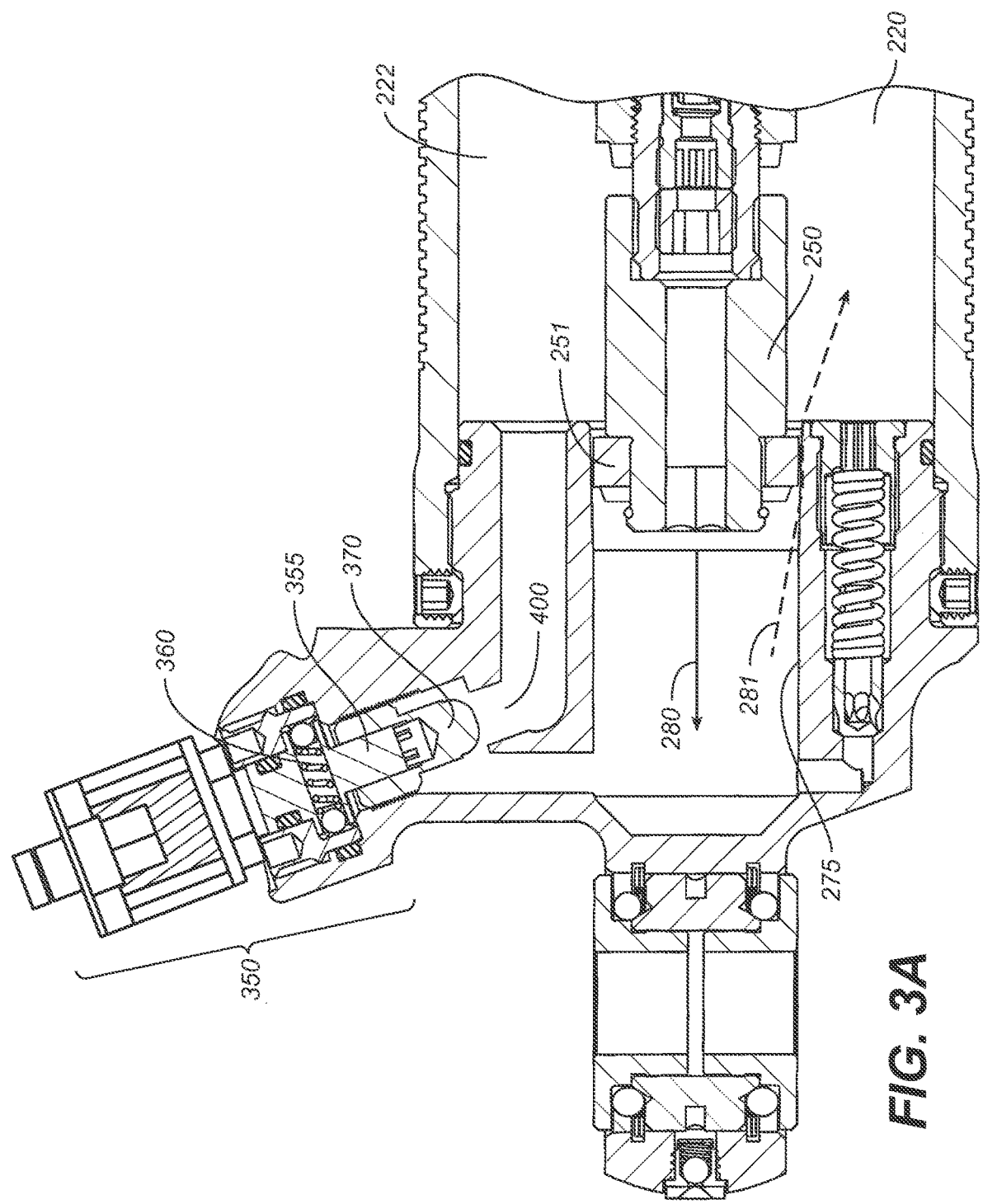
FIG. 3A is a section view showing a bottom out piston entering a bottom out cup during a compression stroke of a shock absorber.

FIG. 3A is a section view showing the bottom out piston 250 entering the bottom out cup 275 during a compression stroke of the shock absorber. The direction of movement of the piston 250 is illustrated by arrow 280. The bottom out piston includes a piston ring or piston seal 251 for axially slideable engagement with an inner diameter of the bottom out cup 275. In the embodiment of FIG. 3A, the upper end of the bottom out cup has a diameter that tapers outwards (i.e. larger) permitting, initially in the stroke, some fluid to pass through an annular area formed between the bottom out piston seal 251 and the inner diameter of the cup 275. The piston by-pass flow of fluid through the annular area and into a compression portion 222 of chamber 220 is illustrated by arrow 281.

Figure 3B:
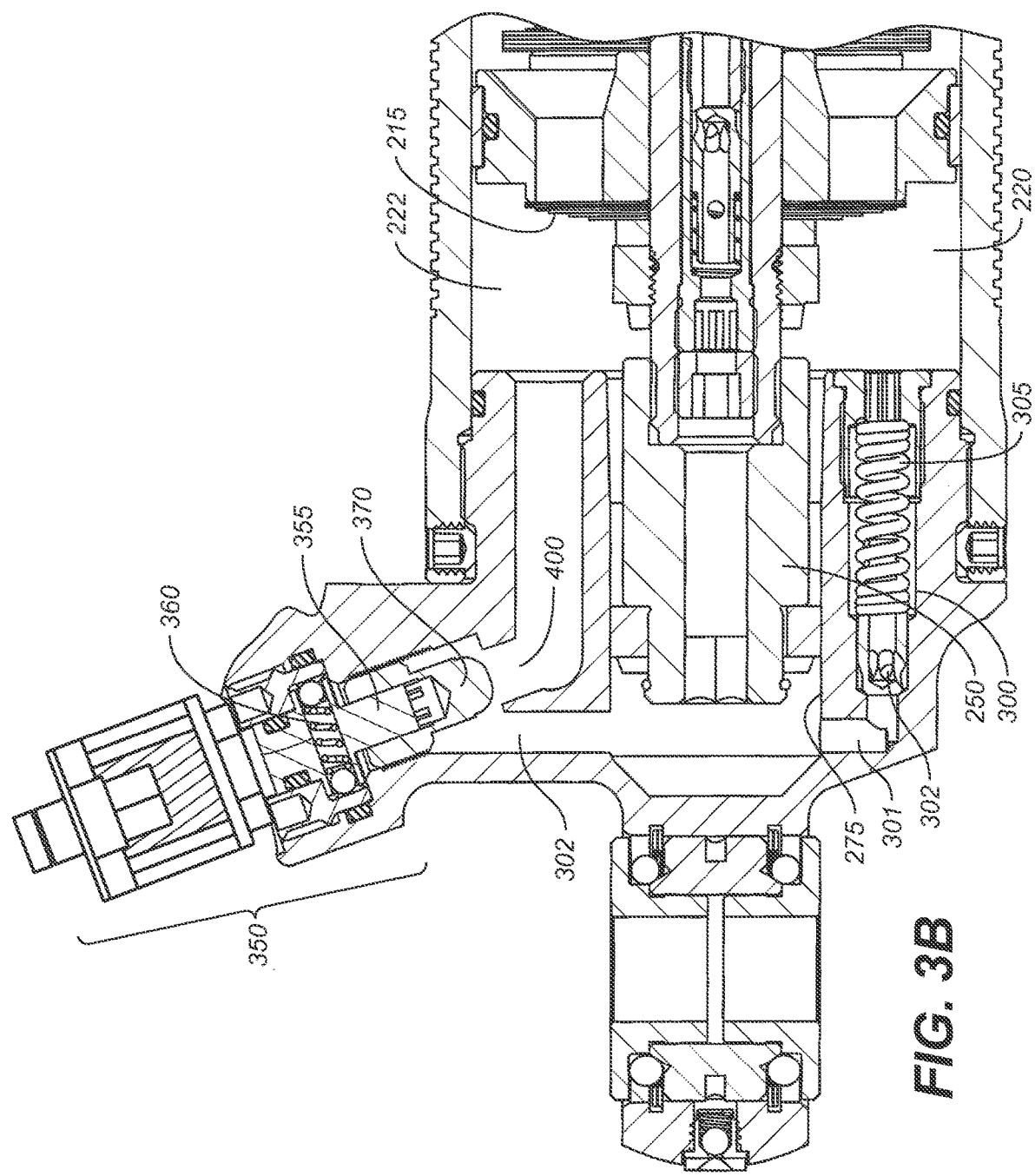
FIG. 3B is a section view showing the bottom out cup of FIG. 3A with the bottom out piston fully engaged and sealed therein.

FIG. 3B is a section view showing the bottom out cup 275 of FIG. 3A with the bottom out piston 250 fully engaged therein. As the piston completely engages the cup 275, dampening is increased because the shaft 215 can only progress further as fluid (e.g. substantially incompressible) is moved from the bottom out cup through one of two flow paths (e.g., flow path 301, and flow path 302) leading back into the compression portion 222 of chamber 220 (and ultimately also into external reservoir 125 if one is used).

FIG. 3B also shows various adjustable dampening mechanisms that work in conjunction with the bottom out cup and piston. At an end of flow path 301 is a pressure relief or "blow-off" valve 300, a high-speed compression circuit that operates at a blow-off threshold, typically due to a relatively rapid event like the rapid compression of the shock absorber. The blow-off valve 300 selectively allows fluid flow from the bottom out cup 275 to the compression portion 222 of chamber 220 at shaft speeds (in the direction of arrow 280) that create fluid pressures within the bottom out cup above the blow-off threshold pressure during engagement of piston 250 with bottom out cup 275. The blow-off valve generally comprises a valve opening, a blow-off valve 300 (or piston) and a compression spring 305. The blow-off pressure is determined by a combination of the spring rate of the spring 305, the preload on the spring 305 and the area of the blow-off valve 300 that is subject to fluid pressure from the bottom out cup 275. When fluid pressure in the cup rises above the predetermined (e.g. preset) threshold, the piston is forced away from the piston seat and allows fluid to flow through the valve opening and into the compression portion 222, thus lowering the pressure within the bottom out cup 275. The blow-off valve 300 is primarily a safety device and is typically set to crack or "blow-off", thereby allowing fluid flow into the compression portion of chamber 220, at a pressure that is relatively high but still low enough to prevent excess pressure build up in the bottom out cup 275 from damaging the shock or the vehicle in which the shock is integrated.

Figure 3C:
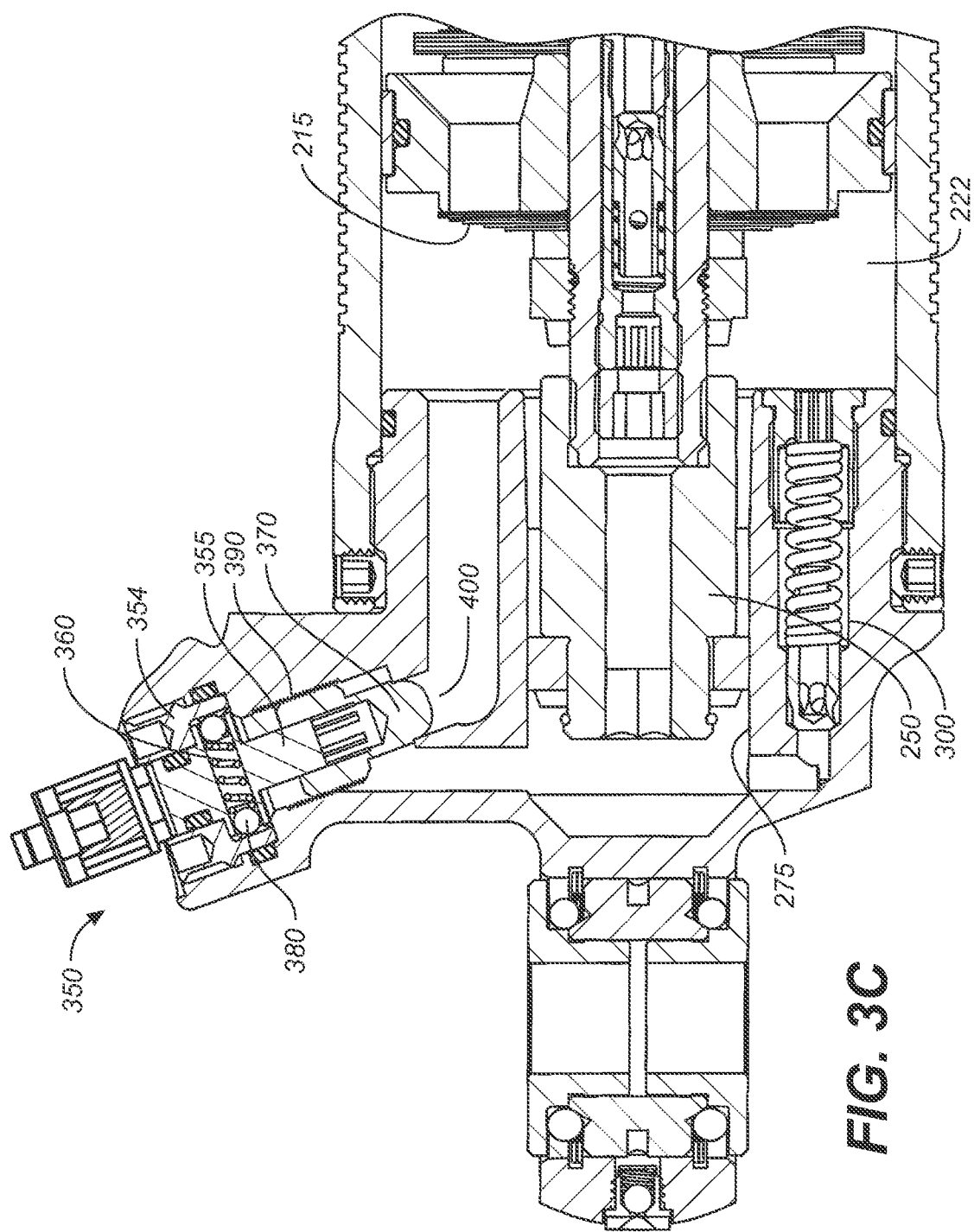
FIG. 3C is a section view of the bottom out cup of FIGS. 3A & 3B showing a blow-off valve and an active valve in communication with the bottom out cup.
Figure 3D:
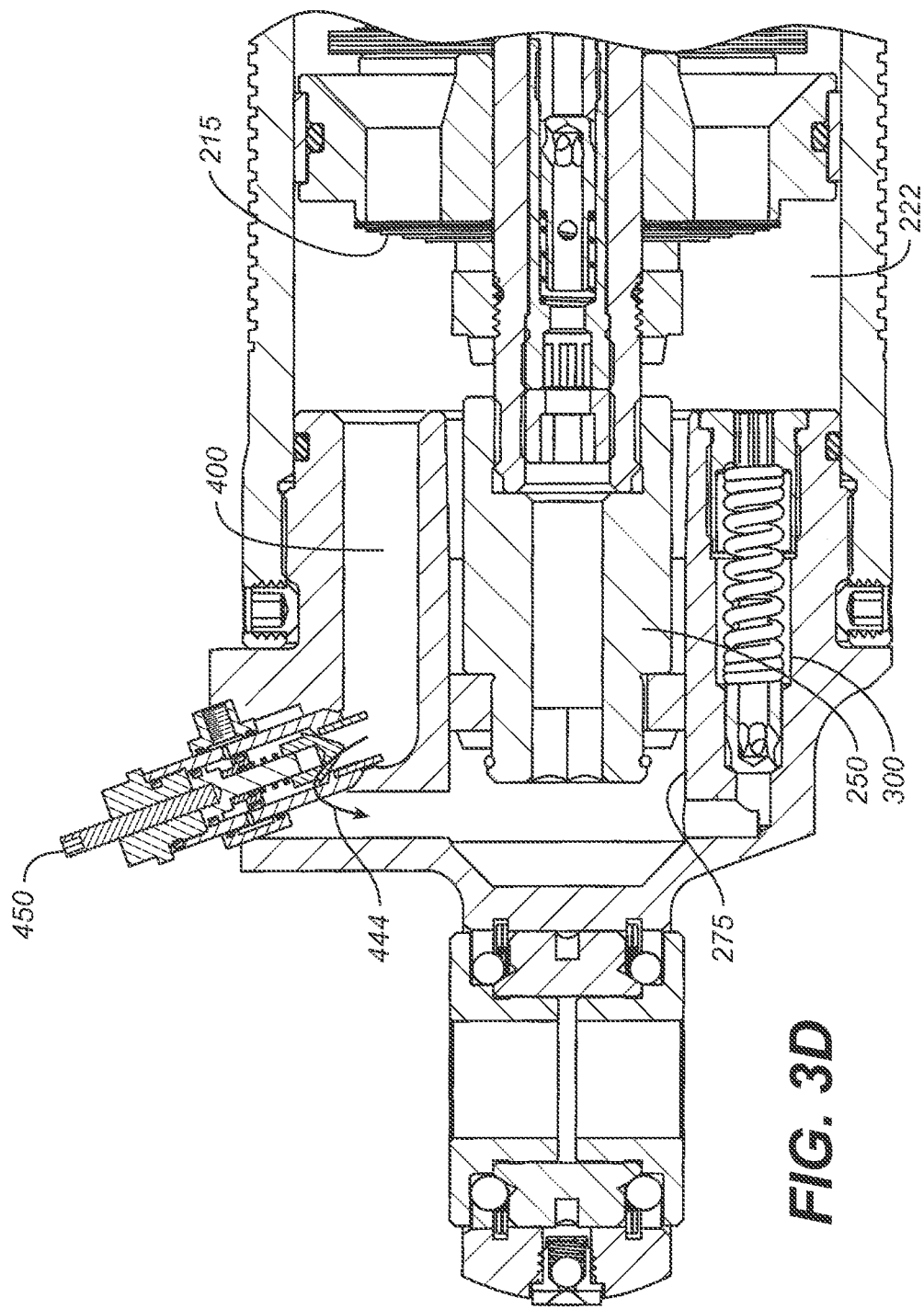
FIG. 3D is a similar view as shown in FIG. 3C showing a blow-off valve and an active valve having a second configuration in communication with the bottom out cup.

Visible in FIGS. 3A-D, at an end of fluid flow path 302 is an active valve 350. Active valve 350 is operable to provide an easily and readily adjustable dampening feature operable with the bottom out cup 275 and piston 250. In FIGS. 3A-B the active valve 350 is shown in an open position whereby fluid may flow through an orifice 400. In FIGS. 3C-D, the valve is shown in a closed position wherein orifice 400 is fully obstructed. The active valve 350 is disposed in a bore formed in the damper housing cap. The active valve 350 assembly consists of a solenoid 506 (of FIG. 5), body 355, nipple 379, and mating threads 390.

In one embodiment, the active valve 350 is a live valve. That is, one or more of components of active valve 350 (e.g., body 355, nipple 379, mating threads 390, or the like) will be actuated automatically based on actual terrain conditions. In operation of the active valve 350, a solenoid electronically turns body 355. As body 355 is turned, the indexing ring 360 consisting of two opposing, outwardly spring-biased balls 380 rotates among indentions formed on an inside diameter of a lock ring 354. The interaction between the balls and the indentions locks the body 355 at each rotational location until the balls 380 are urged out of the indentations by additional rotational force input provided to body 355. The result is that the body 355 will index at various points of its rotation so that positioning of the body 355, and the corresponding setting of active valve 350, is maintained against vibration of the shock and the vehicle while in use.

As the body 355 rotates, so does the valve or nipple 370 at an opposite end of the valve from the head. The body 355 is rotationally engaged with the nipple 370. A male hex member extends from an end of the body 355 into a female hex profile bore formed in the nipple 370. Such engagement transmits rotation from the body 355 to the nipple 370 while allowing axial displacement of the nipple 370 relative to the body 355. Therefore, while the body does not axially move upon rotation, the threaded nipple 370 interacts with mating threads 390 formed on an inside diameter of the bore to transmit axial motion, resulting from rotation and based on the pitch of the threads 390, of the nipple 370 towards and away from an orifice 400 and between a closed and fully open positions.

In one embodiment, the live operation includes an active signal received by a receiver at active valve 350 from a computing device. For example, the user would have an app on a smart phone (or other computing device) and would control the settings via the app. Thus, when the user wanted to adjust the flowrate of the fluid through orifice 400, they would provide the proper command from the computing device and it would be received at active valve 350 which would then automatically operate body 355 causing nipple 370, to close, open, partially close, or partially open orifice 400 to meter the fluid flow.

In operation, the blow-off valve 300 and active valve 350 operate independently of each other but each is designed to permit fluid to pass from the bottom out cup 275 to the compression portion 222 of the chamber 220 in order to lessen the increase in dampening effect (i.e. the "increase" being over that due to the piston 210 and the external reservoir 125 during the majority of the compression stroke) when the bottom out piston 250 engages the bottom out cup. Even when active valve 350 is completely closed with no fluid entering the compression portion of the chamber through the metering active valve 350 (i.e. the bottom out dampening rate is very high), the dampening rate will decrease to some extent when a threshold pressure of blow-off valve 300 is reached, thereby opening blow-off valve 300 and allowing fluid to flow from the bottom out cup 275 to the compression portion of the chamber 220 via flow path 302 and independently of orifice 400.

FIG. 3D is a similar view as shown in FIG. 3C showing a blow-off valve and an active valve having a second configuration in communication with the bottom out cup. FIG. 3D illustrates a section view similar to that of FIG. 3C. As such, and for purposes of clarity, only the differences between FIGS. 3C-3D will be discussed.

FIG. 3D shows an active valve that is operable to provide an easily and readily adjustable dampening feature operable with the bottom out cup 275 and piston 250 with another embodiment of an active valve 450 (as shown in detail in FIG. 7) which is a different configuration than active valve 350, but which operates in the same overall manner and with the same processes as described with respect to FIGS. 3A-C, except that the control of the fluid flow is performed through active valve 450 as it passes through orifice 400.

Figure 4A:
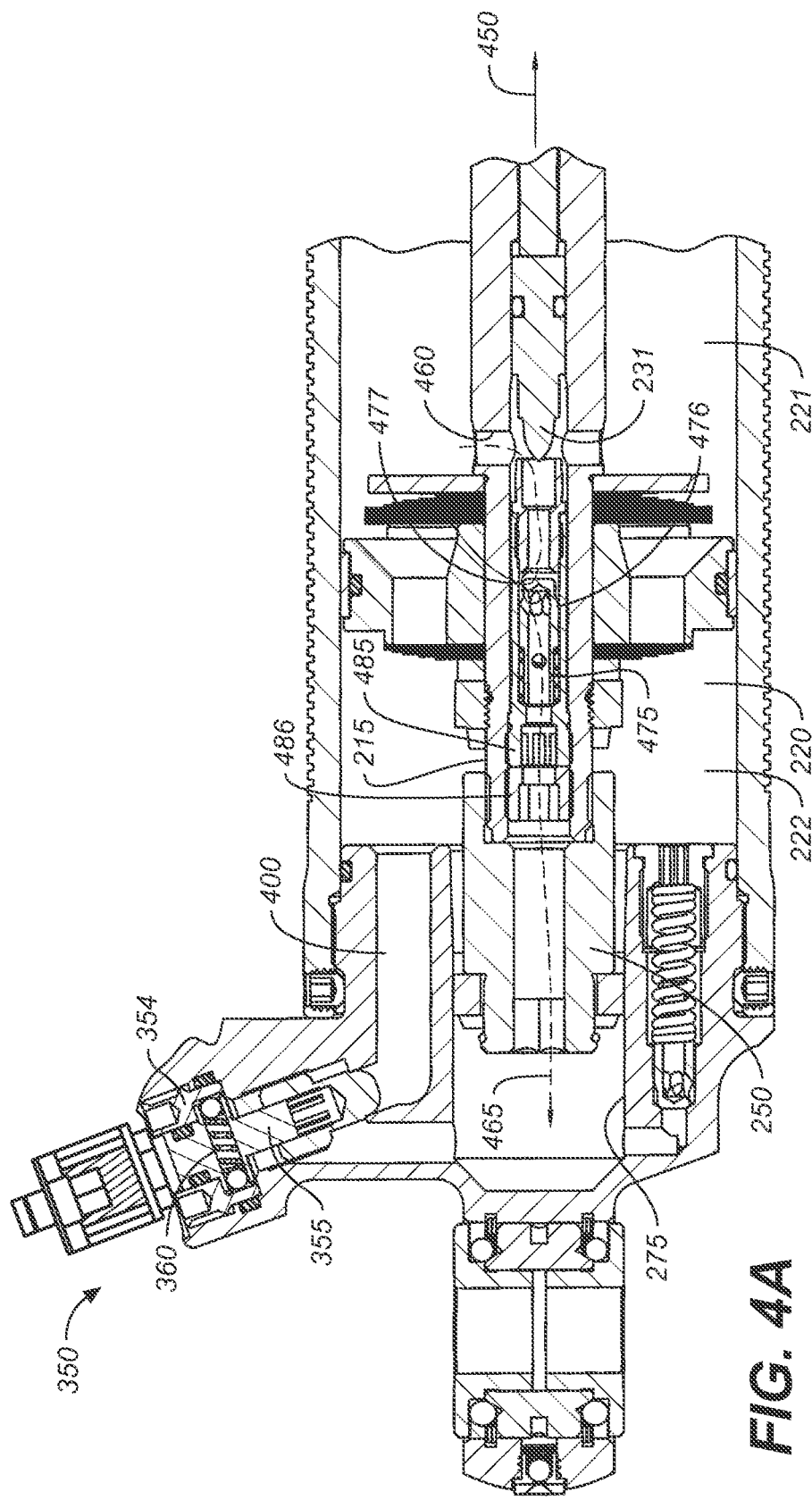
FIG. 4A is a section view showing the bottom out piston being removed from the cup and a piston shaft having a fluid path formed in its interior for providing fluid communication between the bottom out cup and the rebound portion of the dampening chamber during the rebound stroke.

FIG. 4A is a section view showing the shaft 215 with another dampening mechanism operable in conjunction with the bottom out cup 275 and piston 250 and also to operate prior to engagement of the piston in the cup. As indicated by movement direction arrow 465 in FIG. 4A, the bottom out piston 250 is shown being removed from the bottom out cup 275. In the embodiment of FIG. 4A, the shaft 215 includes a fluid path formed in its interior and provides for fluid communication between the bottom out cup 275 and a rebound portion 221 of the chamber 220 during the rebound stroke. The path and direction of flow in the embodiment is illustrated by arrow 465. The path winds through a bore in the shaft that is formed coaxially with the centerline of the shaft. At one end, the fluid path including 475, terminates at a lower end of the bottom out piston 250 and at an upper end, the path terminates at an aperture(s) 460 intersecting the path designated by arrow 465 and leading into the chamber 220.

An adjustment mechanism described herein in relation to FIG. 2, and terminating in bullet shaped member (e.g. adjustable needle valve) 231 permits the volume of fluid flow, upon opening of the check valve 475, to be set by a user. As shown in FIG. 2, shaft 215 includes a mounting eye 225 (or clevis) at one end thereof. The mounting eye 225 includes a valve adjuster 230 which is user-adjustable and movable in and out (e.g. by threaded engagement) of the eye in a direction substantially perpendicular to the longitudinal axis of shaft 215. Shaft 215 also includes a coaxially mounted shaft 235 therein, where shaft 235 is axially movable relative to shaft 215. An end 232 of valve adjuster 230 contacts an end of shaft 235 and rotational movement of valve adjuster 230 causes axial movement of shaft 235 relative to shaft 215. Such axial movement of shaft 235 changes the position of a needle valve 231 inside the shaft and thereby adjusts the low speed fluid flow rate and maximum fluid flow rate though the piston shaft (in the direction that is not blocked by a check valve 475) and thereby allows manual adjustment of the dampening rate.

In addition to a fluid path, the shaft 215 of the embodiment is provided with an adjustable and reversible check valve 475 installed at an upper end of the path and permitting fluid to selectively move in one direction while preventing fluid from moving in an opposite direction. In the embodiment shown in FIG. 4A, fluid is only permitted to move toward the lower end of the bottom out piston 250 (as indicated by arrow 465) and is checked in the reverse direction. The check valve 475 is spring loaded to open at a predetermined (set) fluid pressure in the direction of permitted flow (the direction shown by arrow 465). Varying spring preload will vary the fluid pressure at which the check valve is set to crack.

In one embodiment, as shown, dampening of the shock absorber is reduced in the extending or rebound direction, because the fluid flow through the shaft permits a quicker extension or "rebound" of the shaft by permitting an additional volume of fluid to move from the rebound portion 221 of the chamber 220 to the region below the bottom out piston 250 (which, following bottom out, flows into the bottom out cup below piston 250), thus reducing force required to retract the bottom out piston 250 from the cup 275 and therefore, the shaft 215 and permitting a quicker extension. In another embodiment, not shown, the check valve 475 is reversed and dampening on the compression stroke is reduced by the allowance of additional fluid flow through the shaft 215 and along path designated by arrow 465 but in an opposite direction from the one shown in FIG. 4A as direction of arrow 465. Reversing the check valve from the shown embodiment results in the valve member 476 and seat 477 being oriented towards the bottom out piston.

In order to facilitate easy reversal and adjustment of the check valve, the bore of shaft 215 is provided with threads to accept a check valve cartridge 485. The check valve cartridge 485 is further secured within the shaft 215 by a threaded nut 486. The check valve cartridge 485 and the nut 486 are flush or below flush relative to the lower end of the shaft 215 without additional shaft diameter or length, so that there is no interference with the interface between or operation or assembly of the piston 250 and the shaft 215. The shaft 215 having the provision for a modular check valve cartridge 485 allows for other interchangeable valve configurations without modifying surrounding hardware. For instance, the check valve cartridge 485 may be equipped with fluid flow resistors (chokes), filters or other micro-fluidic devices as, for example, are illustrated in The Lee Company Technical Hydraulic Handbook, which is copyright 1996 by The Lee Company and entirely incorporated by reference herein, or any suitable combination of the foregoing as may be desirable for the tailoring of flowing fluid characteristics. Further, the inclusion of such cartridge check valve requires no additional length in the overall shaft 215/piston 250 assembly.

In one embodiment the damping assembly 200 and bottom out feature are configured and operated, at the user's discretion, without the check valve 475 (or check valve cartridge 485) installed. In that embodiment fluid may flow along the path designated by arrow 465 in either direction, thereby reducing dampening characteristics in both the rebound and compression strokes to the extent allowed by adjustment of the needle valve 231. Alternatively, the needle valve may be completely closed into an adjacent end of check valve cartridge 485 thereby excluding fluid flow in both directions along the path designated by arrow 465.

In one embodiment (not shown) the bottom out chamber or "cup" is located proximate an end of the damping chamber corresponding to the hole through which the shaft enters that chamber. A "bottom out piston" surrounds the shaft and is axially movable relative thereto (there though). The primary damping piston includes a connector which connects it to the bottom out piston and the connector is capable of bearing tension between the two pistons but not compression. A simple embodiment of such a connector may comprise a flexible cable. The bottom out piston is forced into the bottom out cup by direct engagement of the "topping out" primary damping piston at near full extension of the shock absorber. In extended positions of the shock absorber the connector between the primary and bottom out pistons is slack. As the shock absorber is compressed to near bottom out position, the connector is placed in tension and begins to pull the bottom out piston from within the bottom out cup thereby creating a suction (or vacuum) within the bottom out cup. The bottom out cup includes a metering valve, in principle as described herein, for metering fluid through a path between (into) an interior of the bottom out cup (such interior formed by the cup and the engaged bottom out piston) and (from) the rebound chamber thereby relieving the vacuum while creating an increased damping effect near bottom out. It is contemplated that the "bottom out cup" and "bottom out piston" may include many varied embodiments while retaining adjustability.

Each dampening mechanism described is usable with a bottom out cup and piston to provide a variety of selectable and/or adjustable dampening options in a shock absorber near the end of a compression stroke (and some throughout either stroke) or beginning of a rebound stroke. Embodiments described herein may also be adapted to work with dampeners generally as if the bottom out piston 250 and the bottom out cup described herein where the dampening piston and cylinder. For example, active valve 350 can be initially set to permit a predetermined amount of fluid to flow between the cup and the compression portion 222 chamber 220 of the vehicle damping assembly 200. The blow-off valve 300, depending upon its setting, permits fluid flow in the event that pressure in the cup exceeds the threshold pressure of the blow-off valve circuit. Operation of the blow-off valve is in part determinable by the setting of active valve 350 as its more or less metering of fluid operates to lessen or increase, respectively, the fluid pressure in the bottom out cup. Also, the reversible check valve 475 in the hollow shaft can be arranged to reduce dampening in either the compression or the rebound stroke of the piston.

Referring still to FIGS. 3A-4D, in various embodiments of the present invention, damping assembly 200 includes a bottom out orifice 400 whose flow rate (or size of opening) is adjusted by the operation of nipple 370 of active valve 350, such that the flowrate of the fluid between the cup and the compression portion 222 of chamber 220 of the damper, via orifice 400 is automatically adjustable using active valve 350 to move nipple 370 closer to or further from orifice 400. In one such embodiment, active valve 350 is solenoid operated, hydraulically operated, pneumatically operated, or operated by any other suitable motive mechanism. Active valve 350 may be operated remotely by a switch or potentiometer located in the cockpit of a vehicle or attached to appropriate operational parts of a vehicle for timely activation (e.g. brake pedal) or may be operated in response to input from a microprocessor (e.g. calculating desired settings based on vehicle acceleration sensor data) or any suitable combination of activation means. In like manner, a controller for active valve 350 may be cockpit mounted and may be manually adjustable or microprocessor controlled or both or selectively either.

It may be desirable to increase the damping rate or effective stiffness of dampening assembly 200 when moving a vehicle from off-road to on highway use. Off-road use often requires a high degree of compliance to absorb shocks imparted by the widely varying terrain. On highway use, particularly with long wheel travel vehicles, often requires more rigid shock absorption to allow a user to maintain control of a vehicle at higher speeds. This may be especially true during cornering or braking.

One embodiment comprises a four-wheeled vehicle having dampening assembly 200 to automatically control the fluid flow between the cup and the compression portion 222 of chamber 220. As such, the damper is automatically adjustable using active valve 350 at each (of four) wheel.

For example, the opening size of orifice 400 which controls the flowrate of the fluid between the cup and the compression portion 222 of chamber 220 is automatically adjusted by active valve 350 (including, for example, a remotely controllable active valve). In one embodiment, each of the front shock absorbers may be electrically connected with a linear switch (such as that which operates an automotive brake light) that is activated in conjunction with the vehicle brake. When the brake is moved beyond a certain distance, corresponding usually to harder braking and hence potential for vehicle nose dive, the electric switch connects a power supply to a motive force generator for active valve 350 in the front shocks causes active valve 350 to automatically move body 355 and/or nipple 370 and cause nipple 370 to open, close, or partially close fluid flow through orifice 400.

In so doing, the reduction in fluid flow rate through orifice 400 increases the stiffness of that shock. As such, the front shocks become more rigid during hard braking. Other mechanisms may be used to trigger the shocks such as accelerometers (e.g. tri-axial) for sensing pitch and roll of the vehicle and activating, via a microprocessor, the appropriate amount of rotation of active valve 350 to cause nipple 370 to open, close, or partially close orifice 400 (and corresponding adjustment of the size of orifice 400 modifies the flowrate of the fluid between the cup and the compression portion 222 of chamber 220 for the corresponding dampening assembly 200) for optimum vehicle control.

In one embodiment, a vehicle steering column includes right turn and left turn limit switches such that a hard turn in either direction activates the appropriate adjustment of active valve 350 to cause nipple 370 to open, close, or partially close orifice 400 (and corresponding adjustment of the size of orifice 400 modifies the flowrate of the fluid between the cup and the compression portion 222 of chamber 220 for the corresponding dampening assembly 200) of shocks opposite that direction (for example, a hard, right turn would cause more rigid shocks on the vehicle's left side). Again, accelerometers in conjunction with a microprocessor (e.g., a comparer) and a switched power supply may perform the active valve 350 activation function by sensing the actual g-force associated with the turn (or braking; or acceleration for the rear shock activation) and triggering the appropriate amount of rotation of active valve 350 to cause nipple 370 to open, close, or partially close orifice 400 (and corresponding adjustment of the size of orifice 400 modifies the flowrate of the fluid between the cup and the compression portion 222 of chamber 220 for the corresponding dampening assembly 200) at a predetermined acceleration threshold value (e.g., a g-force).

Figure 4B:
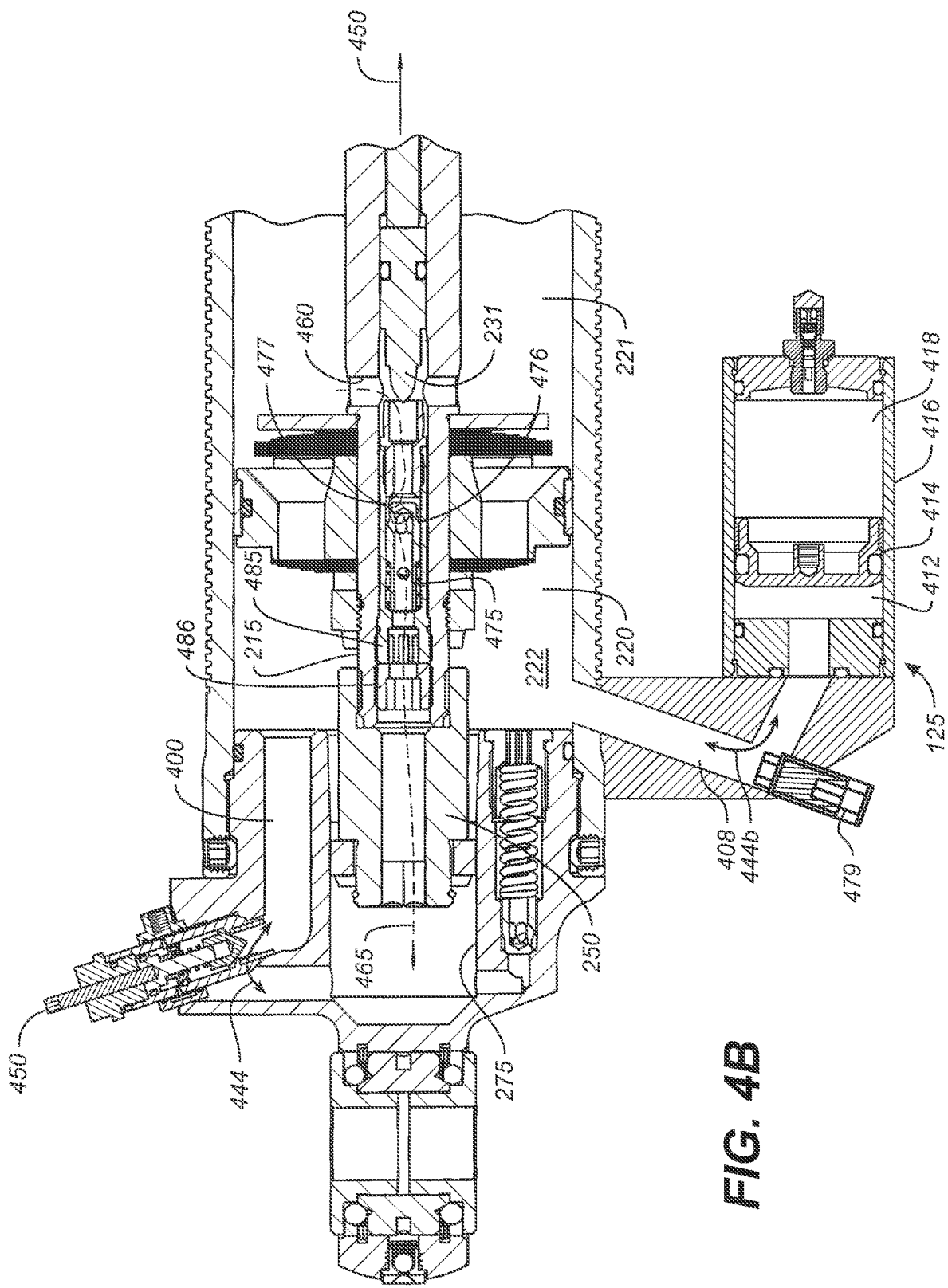
FIG. 4B is a section view similar to FIG. 4A with an active valve having a second configuration for controlling the bottom out and a reservoir, in accordance with an embodiment.
Figure 4C:
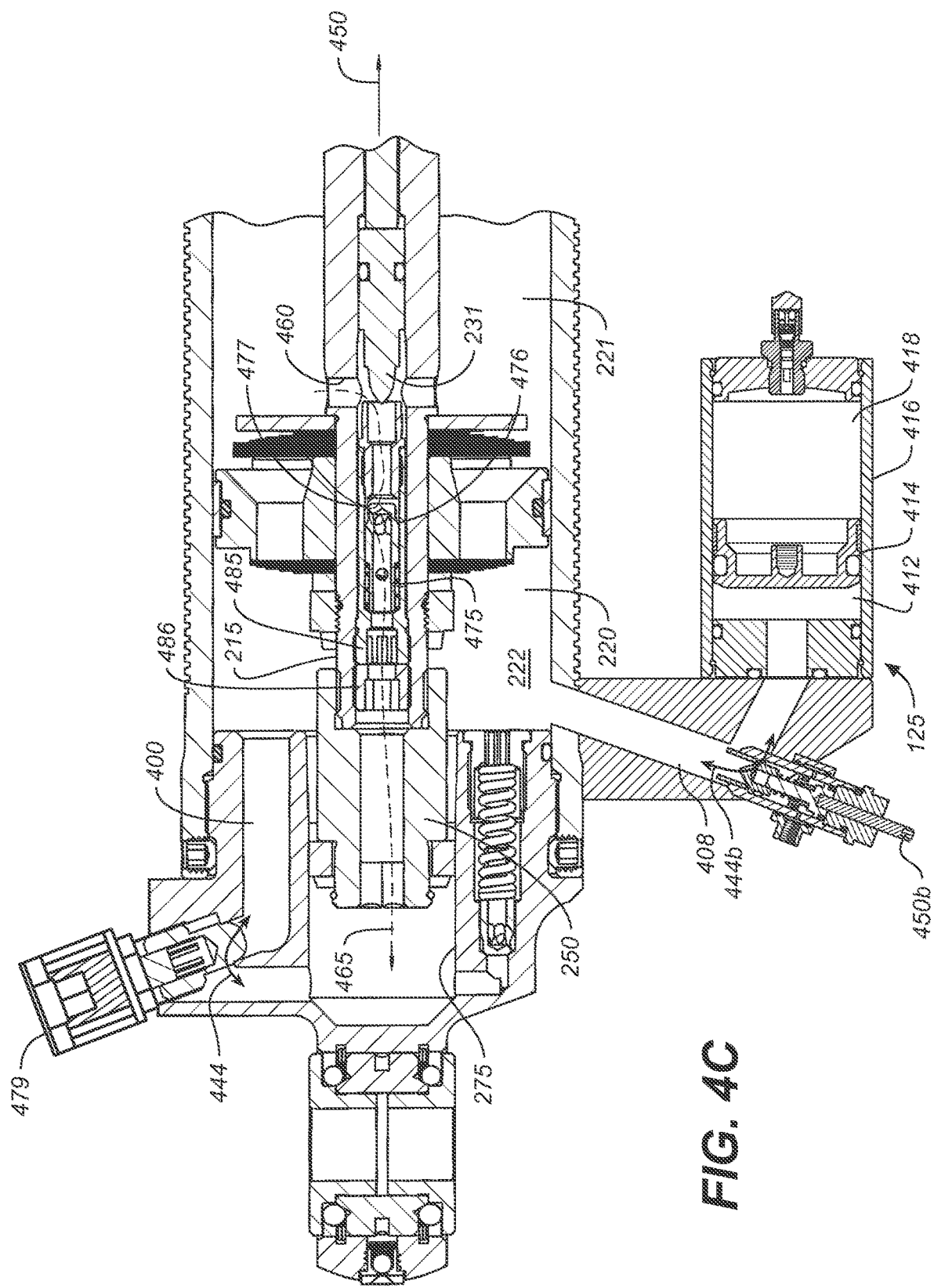
FIG. 4C is a section view similar to FIG. 4A with a non-active valve controlling the bottom out an active valve having a second configuration for controlling flow to the reservoir, in accordance with an embodiment.
Figure 4D:
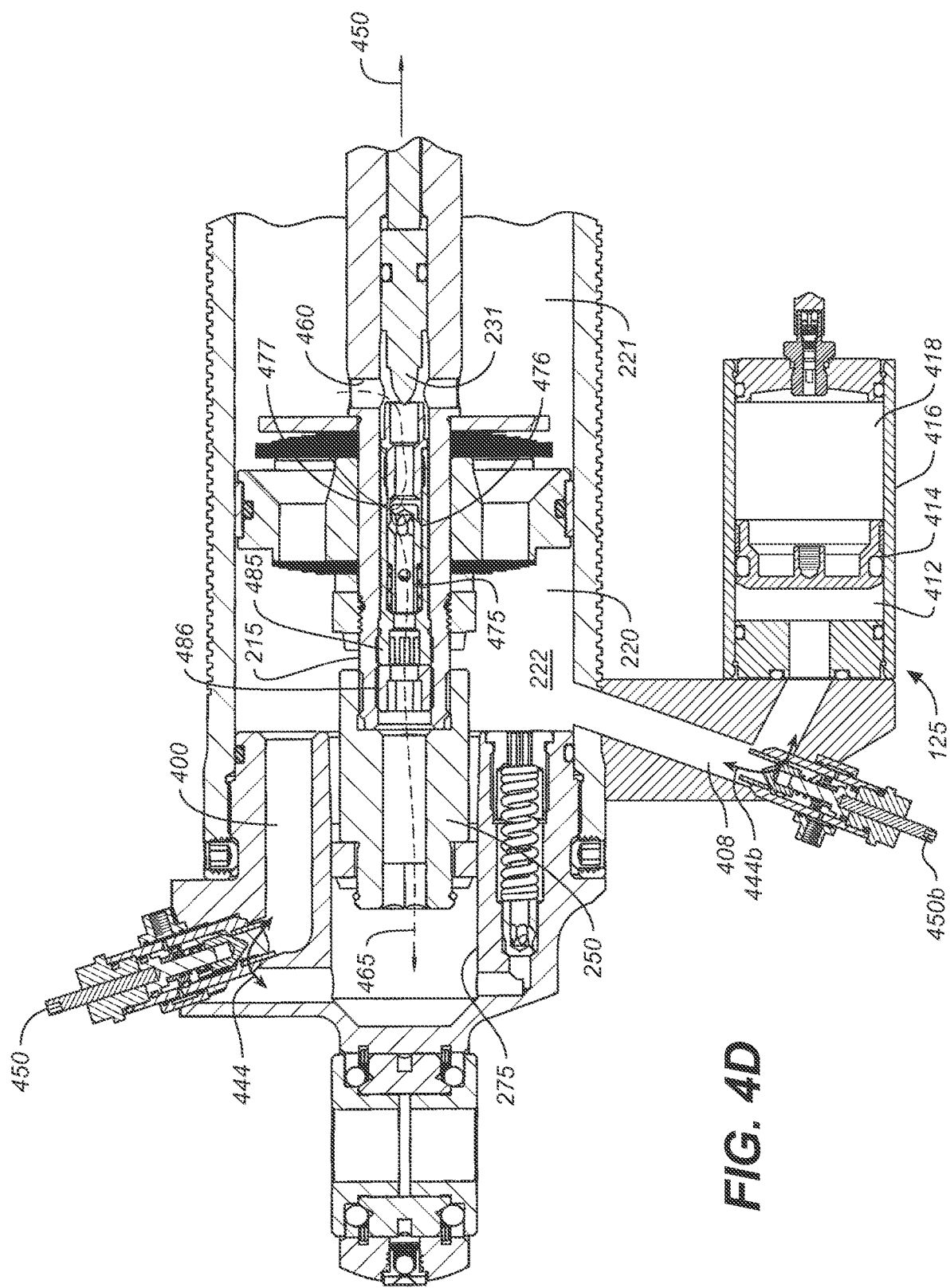
FIG. 4D is a section view similar to FIG. 4A with an active valve having a second configuration for controlling the bottom out and second active valve controlling the flow to a reservoir, in accordance with an embodiment.

FIGS. 4B-4D each illustrate a section view similar to that of FIG. 4A. As such, and for purposes of clarity, only the differences between each of FIGS. 4B-4D will be discussed. In FIGS. 4B-4D, active valve 350 is replaced with another configuration of an active valve (e.g., active valve 450 described in detail in FIG. 7). FIGS. 4B-4D also include an external reservoir 125 that is in fluid communication with the chamber 220 for receiving and supplying working fluid as the piston 210 moves in and out of the chamber 220. The external reservoir 125 includes a reservoir cylinder 416 in fluid communication with the compression portion 222 of chamber 220 via the fluid conduit 408. The external reservoir 125 also includes a floating piston 414 with a volume of gas on a backside 418 ("blind end" side) of it, the gas being compressible as the reservoir cylinder 416, on the "frontside" 412 fills with working fluid due to movement of the piston 210 into the chamber 220. Certain features of reservoir type dampers are shown and described in U.S. Pat. No. 7,374,028, which is incorporated herein, in its entirety, by reference.

FIG. 4B has an active valve 450 having a second configuration for controlling the bottom out (as described in detail in FIG. 7), external reservoir 125 and an (optional) non-active valve 479 for controlling the flow between the external reservoir 125 and the vehicle damping assembly 200 as indicated by flow arrows 444b, in accordance with an embodiment. In one embodiment, active valve 450 is a live valve as described in further detail in FIGS. 5-7 while non-active valve 479 refers to a manual valve that may be adjustable but is not electronically adjustable. In one embodiment, active valve 450 will be actuated automatically based on actual terrain conditions. For example, active valve 450 is operated as discussed in FIGS. 5-7 to open, close or partially allow flow through orifice 400 to modify the flowrate of the fluid between the cup and the compression portion 222 chamber 220 of the vehicle damping assembly 200.

In one embodiment, the live operation includes an active signal received by a receiver at active valve 450 from a computing system. Thus, to meter (or adjust) the flowrate of the fluid between the cup and the compression portion 222 chamber 220 of the vehicle damping assembly 200, via orifice 400, the command would be provided from the computing system and received at active valve 450 which would then automatically open, close or partially allow fluid flow through orifice 400.

FIG. 4C is a section view similar to FIG. 4A with a non-active valve 479 controlling the bottom out and active valve 450 having a second configuration for controlling flow to the external reservoir 125, in accordance with an embodiment. In other words, a non-active valve 479 is used in place of the active valve 450 in the bottom-out configuration and an active valve 450b is used to meter the fluid between the external reservoir 125 and the vehicle damping assembly 200 via fluid conduit 408. As discussed herein, active valve 450b can open or close the flow path (e.g., fluid conduit 408) between the external reservoir 125 and the vehicle damping assembly 200 as indicated by flow arrows 444b.

Figure 5:
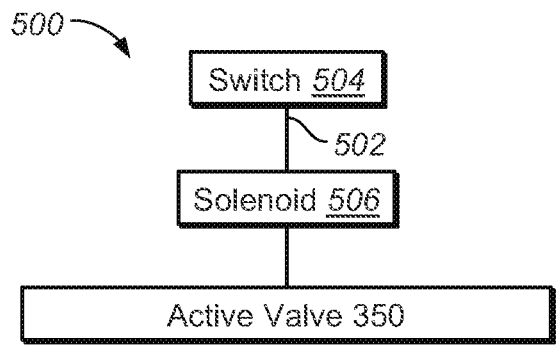
FIG. 5 is a schematic diagram showing a control arrangement for an active valve, in accordance with an embodiment.
Figure 6:
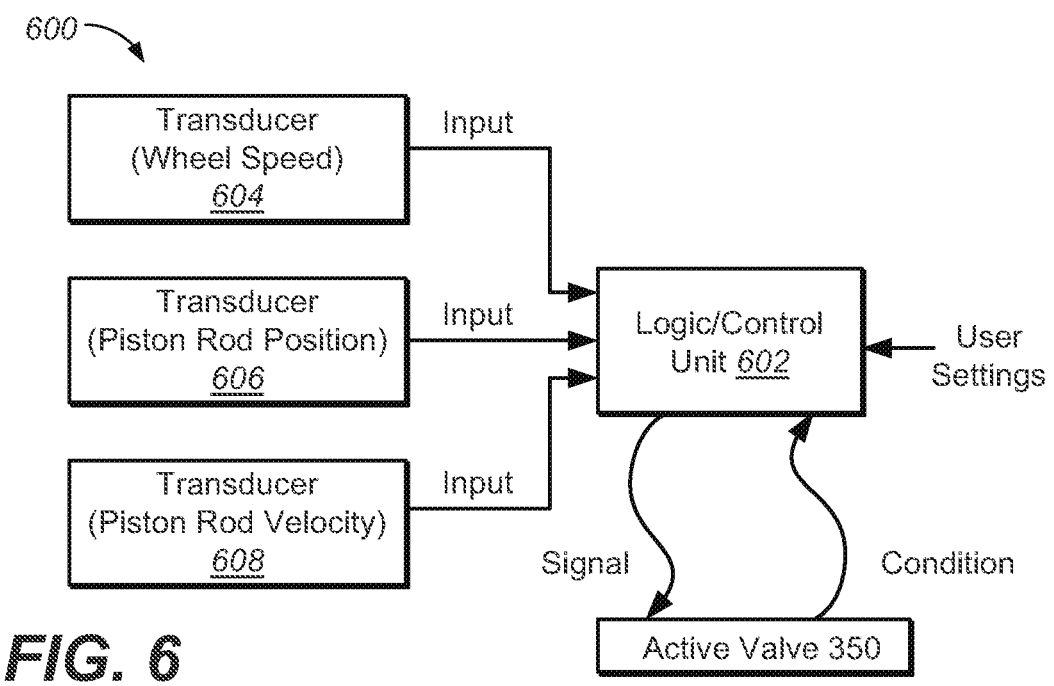
FIG. 6 is a schematic diagram of a control system based upon any or all of vehicle speed, damper rod speed, and damper rod position, in accordance with an embodiment.
Figure 7:
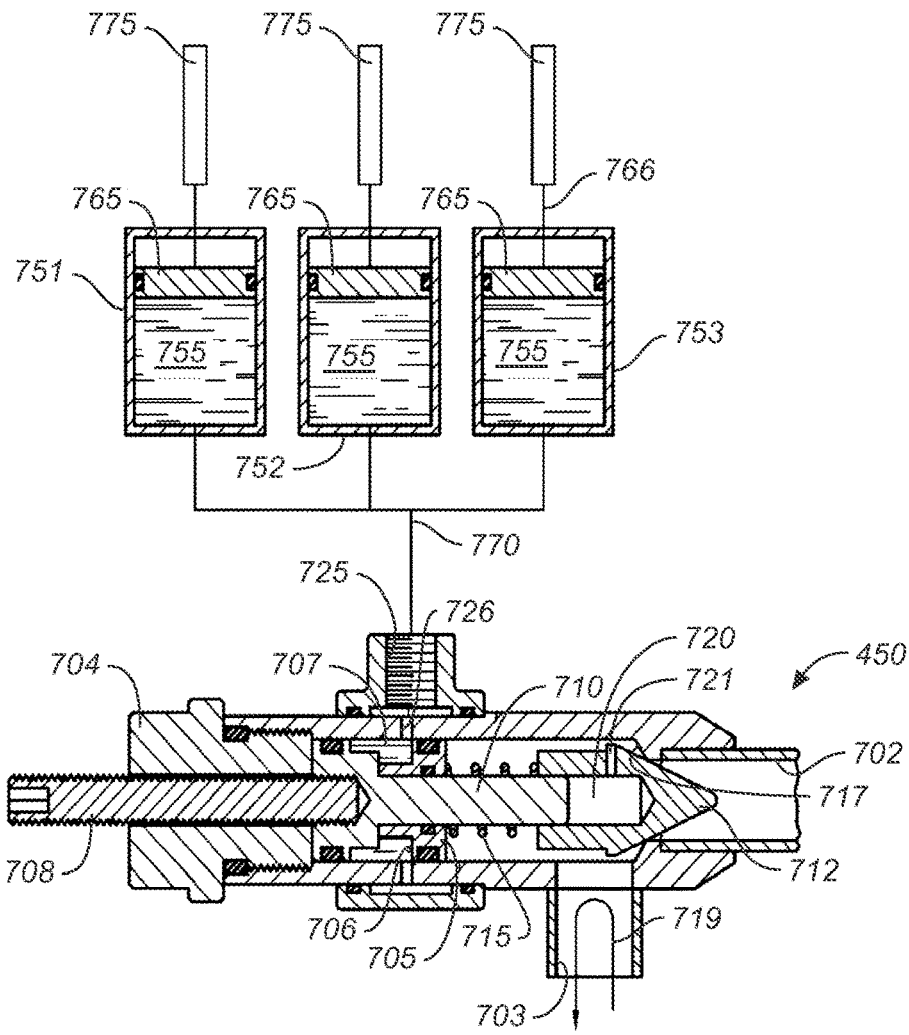
FIG. 7 is an enlarged section view showing an active bottom out valve and a plurality of valve operating cylinders in selective communication with an annular piston surface of the valve, in accordance with an embodiment.

In one embodiment, active valve 450b is a live valve as described in further detail in FIGS. 5-7 while non-active valve 479 refers to a manual valve that may be adjustable but is not electronically adjustable. In one embodiment, active valve 450b will be actuated automatically based on actual terrain conditions. For example, active valve 450b is operated as discussed in FIGS. 5-7 to open, close or partially allow flow through fluid conduit 408 to modify the flowrate of the fluid between the external reservoir 125 and the vehicle damping assembly 200.

In one embodiment, the live operation includes an active signal received by a receiver at active valve 450b from a computing system. Thus, to meter (or adjust) the flowrate of the fluid between external reservoir 125 and the vehicle damping assembly 200, via fluid conduit 408, the command would be provided from the computing system and received at active valve 450b which would then automatically open, close or partially allow fluid flow through fluid conduit 408.

FIG. 4D is a section view similar to FIG. 4A with an active valve 450 having a second configuration for controlling the bottom out and second active valve 450b (which is similar to the active valve 350 and/or 450 as described herein, except that it is provided in fluid conduit 408 instead of orifice 400), in accordance with an embodiment. In FIG. 4D, external reservoir 125 is similar to external reservoir 125 of FIG. 4C in that active valve 450b is provided in the fluid conduit 408 which can open or close the flow path between the external reservoir 125 and the vehicle damping assembly 200 as indicated by flow arrows 444.

In one embodiment, both the active valve 450 and active valve 450b are live valves as described in further detail in FIGS. 5-7. In one embodiment, active valve 450 and/or active valve 450b will be actuated automatically based on actual terrain conditions. For example, active valve 450 and/or active valve 450b are operated as discussed in FIGS. 5-7 to open, close or partially allow flow through the different flow paths to modify the flowrate of the fluid through the different flow paths.

In one embodiment, the live operation includes an active signal received by a receiver at active valve 450 and/or active valve 450b from a computing system. Thus, to adjust the flowrate of the fluid between the cup and the compression portion 222 chamber 220 of the vehicle damping assembly 200, via orifice 400, the command would be provided from the computing system and received at active valve 450 which would then automatically open, close or partially allow fluid flow through orifice 400. Similarly, the computing system can provide an active signal received by a receiver at active valve 450*b* to adjust the flowrate of the fluid between the cup and the compression portion 222 chamber 220 of the vehicle damping assembly 200, via orifice 400, the would be provided from the computing system and received at active valve 450*b* which would then automatically open, close or partially allow fluid flow through orifice 400.

Although two active valves are shown in FIG. 4D, it is understood that any number of active valves corresponding to any number of fluid channels (e.g., bottom out channels, external reservoir channels, bottom out channels, etc.) for a corresponding number of vehicle suspension dampers could be used alone or in combination. That is, one or more active valves could be operated simultaneously or separately depending upon needs in a vehicular suspension system. For example, a suspension damper could have one, a combination of, or each of an active valve(s) and or inert valves: for an internal bottom out, for an external bottom out, for a fluid conduit 408 to the external reservoir 125, etc. In other words, anywhere there is a fluid flow path within a damping assembly 200, an active valve could be used. Moreover, the active valve could be alone or used in combination with other active valves, and/or other inert valves, at other fluid flow paths to automate one or more of the damping performance characteristics of the dampening assembly. Moreover, additional switches could permit individual operation of separate active valves.

FIG. 5 is a schematic diagram showing a control arrangement 500 for a remotely-operated active valve 350. As illustrated, a signal line 502 runs from a switch 504 to a solenoid 506. Thereafter, the solenoid 506 converts electrical energy into mechanical movement and rotates body 355 within active valve 350, In one embodiment, the rotation of body 355 causes indexing ring 360 consisting of two opposing, outwardly spring-biased balls 380 to rotate among indentions formed on an inside diameter of a lock ring 354.

As the body 355 rotates, nipple 370 at an opposite end of the valve is advanced or withdrawn from an opening in orifice 400. For example, the body 355 is rotationally engaged with the nipple 370. A male hex member extends from an end of the body 355 into a female hex profile bore formed in the nipple 370. Such engagement transmits rotation from the body 355 to the nipple 370 while allowing axial displacement of the nipple 370 relative to the body 355. Therefore, while the body does not axially move upon rotation, the threaded nipple 370 interacts with mating threads 390 formed on an inside diameter of the bore to transmit axial motion, resulting from rotation and based on the pitch of the threads 390, of the nipple 370 towards or away from an orifice 400, between a closed position, a partially open position, and a fully or completely open position.

Adjusting the opening of orifice 400 modifies the flowrate of the fluid between the cup and the compression portion 222 of chamber 220 thereby varying the stiffness of a corresponding dampening assembly 200. While FIG. 5 is simplified and involves control of a single active valve 350, it will be understood that any number of active valves corresponding to any number of fluid channels (e.g., bypass channels, external reservoir channels, bottom out channels, etc.) for a corresponding number of vehicle suspension dampers could be used alone or in combination. That is, one or more active valves could be operated simultaneously or separately depending upon needs in a vehicular suspension system. For example, a suspension damper could have one, a combination of, or each of an active valve(s): for a bottom out control, an internal bypass, for an external bypass, for a fluid conduit to the external reservoir 125, etc. In other words, anywhere there is a fluid flow path within a dampening assembly 200, an active valve could be used. Moreover, the active valve could be alone or used in combination with other active valves at other fluid flow paths to automate one or more of the damping performance characteristics of the dampening assembly. Moreover, additional switches could permit individual operation of separate active bottom out valves.

As discussed, a remotely-operable active valve 350 like the one described above is particularly useful with an on-/off-road vehicle. These vehicles can have more than 20" of shock absorber travel to permit them to negotiate rough, uneven terrain at speed with usable shock absorbing function. In off-road applications, compliant dampening is necessary as the vehicle relies on its long travel suspension when encountering often large off-road obstacles. Operating a vehicle with very compliant, long travel suspension on a smooth road at road speeds can be problematic due to the springiness/sponginess of the suspension and corresponding vehicle handling problems associated with that (e.g. turning roll, braking pitch). Such compliance can cause reduced handling characteristics and even loss of control. Such control issues can be pronounced when cornering at high speed as a compliant, long travel vehicle may tend to roll excessively. Similarly, such a vehicle may include excessive pitch and yaw during braking and/or acceleration. With the remotely-operated active valve 350, the working size of orifice 400 is automatically adjusted thereby modifying the communication of fluid between the cup and the compression portion 222 of chamber 220 for the corresponding dampening assembly 200. Correspondingly, the dampening characteristics of dampening assembly 200 can be changed.

In addition to, or in lieu of, the simple, switch-operated remote arrangement of FIG. 5, the remotely-operable active valve 350 can be operated automatically based upon one or more driving conditions. FIG. 6 shows a schematic diagram of a control system 600 based upon any or all of vehicle speed, damper rod speed, and damper rod position. One embodiment of the arrangement of FIG. 6 is designed to automatically increase dampening in a shock absorber in the event a damper rod reaches a certain velocity in its travel towards the bottom end of a damper at a predetermined speed of the vehicle. In one embodiment, the control system 600 adds dampening (and control) in the event of rapid operation (e.g. high rod velocity) of the dampening assembly 200 to avoid a bottoming out of the damper rod as well as a loss of control that can accompany rapid compression of a shock absorber with a relative long amount of travel. In one embodiment, the control system 600 adds dampening (e.g., adjusts the size of the opening of orifice 400 by causing nipple 370 to open, close, or partially close orifice 400) in the event that the rod velocity in compression is relatively low but the rod progresses past a certain point in the travel.

Such configuration aids in stabilizing the vehicle against excessive low-rate suspension movement events such as cornering roll, braking and acceleration yaw and pitch and "g-out."

FIG. 6 illustrates, for example, a control system 600 including three variables: wheel speed, corresponding to the speed of a vehicle component (measured by wheel speed transducer 604), piston rod position (measured by piston rod position transducer 606), and piston rod velocity (measured by piston rod velocity transducer 608). Any or all of the variables shown may be considered by logic unit 602 in controlling the solenoids or other motive sources coupled to active valve 350 for changing the working size of the opening of orifice 400 by causing nipple 370 to open, close, or partially close orifice 400. Any other suitable vehicle operation variable may be used in addition to or in lieu of the variables discussed herein, such as, for example, piston rod compression strain, eyelet strain, vehicle mounted accelerometer (or tilt/inclinometer) data or any other suitable vehicle or component performance data.

In one embodiment, the piston's position within the damping chamber is determined using an accelerometer to sense modal resonance of the suspension damper. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber to provide a sensor to monitor the position and/or speed of the piston (and suitable magnetic tag) with respect to a housing of the suspension damper.

In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. A transducer-operated arrangement for measuring piston rod speed and velocity is described in U.S. Pat. No. 5,952,823 and that patent is incorporated by reference herein in its entirety.

While transducers located at the suspension damper measure piston rod velocity (piston rod velocity transducer 608), and piston rod position (piston rod position transducer 606), a separate wheel speed transducer 604 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 6, the logic unit 602 with user-definable settings receives inputs from piston rod position transducer 606, piston rod velocity transducer 608, as well as wheel speed transducer 604. Logic unit 602 is user-programmable and, depending on the needs of the operator, logic unit 602 records the variables and, then, if certain criteria are met, logic unit 602 sends its own signal to active valve 350 (e.g., the logic unit 602 is an activation signal provider) to cause active valve 350 to move into the desired state (e.g., adjust the flow rate by adjusting the distance between nipple 370 and orifice 400). Thereafter, the condition, state or position of active valve 350 is relayed back to logic unit 602 via an active valve monitor or the like.

In one embodiment, logic unit 602 shown in FIG. 6 assumes a single active valve 350 corresponding to a single orifice 400 of a single dampening assembly 200, but logic unit 602 is usable with any number of active valves or groups of active valves corresponding to any number of orifices, or groups of orifices. For instance, the suspension dampers on one side of the vehicle can be acted upon while the vehicles other suspension dampers remain unaffected.

While the examples illustrated relate to manual operation and automated operation based upon specific parameters, active valve 350 can be remotely-operated and can be used in a variety of ways with many different driving and road variables. In one example, active valve 350 is controlled based upon vehicle speed in conjunction with the angular location of the vehicle's steering wheel. In this manner, by sensing the steering wheel turn severity (angle of rotation), additional dampening (by adjusting the corresponding size of the opening of orifice 400 by causing nipple 370 to open, close, or partially close orifice 400) can be applied to one dampening assembly 200 or one set of vehicle suspension dampers on one side of the vehicle (suitable for example to mitigate cornering roll) in the event of a sharp turn at a relatively high speed.

In another example, a transducer, such as an accelerometer, measures other aspects of the vehicle's suspension system, like axle force and/or moments applied to various parts of the vehicle, like steering tie rods, and directs change to position of active valve 350 (and corresponding change to the working size of the opening of orifice 400 by causing nipple 370 to open, close, or partially close orifice 400) in response thereto. In another example, active valve 350 is controlled at least in part by a pressure transducer measuring pressure in a vehicle tire and adding dampening characteristics to some or all of the wheels (by adjusting the working size of the opening of orifice 400 by causing nipple 370 to open, close, or partially close orifice 400) in the event of, for example, an increased or decreased pressure reading. In one embodiment, active valve 350 is controlled in response to braking pressure (as measured, for example, by a brake pedal (or lever) sensor or brake fluid pressure sensor or accelerometer). In still another example, a parameter might include a gyroscopic mechanism that monitors vehicle trajectory and identifies a "spin-out" or other loss of control condition and adds and/or reduces dampening to some or all of the vehicle's dampers (by adjusting the working size of the opening of orifice 400 by causing nipple 370 to open, close, or partially close orifice 400 chambers) in the event of a loss of control to help the operator of the vehicle to regain control.

FIG. 7 is an enlarged view showing an embodiment of a remotely operable active valve 450. Although FIG. 7 shows the active valve 450 in a closed position (e.g. during a rebound stroke of the damper), the following discussion also includes the opening of active valve 450. Active valve 450 includes a valve body 704 housing a movable piston 705 which is sealed within the body. The piston 705 includes a sealed chamber 707 adjacent an annularly-shaped piston surface 706 at a first end thereof. The chamber 707 and annular piston surface 706 are in fluid communication with a port 725 accessed via opening 726. Two additional fluid communication points are provided in the body including an inlet 702 and an outlet 703 for fluid passing through the active valve 450.

Extending from a first end of the piston 705 is a shaft 710 having a cone-shaped valve member 712 (other shapes such as spherical or flat, with corresponding seats, will also work suitably well) disposed on an end thereof. The cone-shaped member 712 is telescopically mounted relative to, and movable on, the shaft 710 and is biased toward an extended position due to a spring 715 coaxially mounted on the shaft 710 between the member 712 and the piston 705. Due to the spring biasing, the cone-shaped member 712 normally seats itself against a seat 717 formed in an interior of the valve body 704.

As shown, the cone shaped member 712 is seated against seat 717 due to the force of the spring 715 and absent an opposite force from fluid entering the active valve 450 along orifice 400 (of FIGS. 3B-3D). As member 712 telescopes out, a gap 720 is formed between the end of the shaft 710 and an interior of member 712. A vent 721 is provided to relieve any pressure formed in the gap. With a fluid path through the active valve 450 (from 703 to 702) closed, fluid communication is substantially shut off from the rebound side of the cylinder into the valve body (and hence through the bottom out back to the compression side) and its "dead-end" path is shown by arrow 719.

In one embodiment, there is a manual pre-load adjustment on the spring 715 permitting a user to hand-load or un-load the spring using a threaded member 708 that transmits motion of the piston 705 towards and away from the conical member, thereby changing the compression on the spring 715.

Also shown in FIG. 7 is a plurality of valve operating cylinders 751, 752, 753. In one embodiment, the cylinders each include a predetermined volume of fluid 755 that is selectively movable in and out of each cylindrical body through the action of a separate corresponding piston 765 and rod 766 for each cylindrical body. A fluid path 770 runs between each cylinder and port 725 of the valve body where annular piston surface 706 is exposed to the fluid.

Because each cylinder has a specific volume of substantially incompressible fluid and because the volume of the sealed chamber 707 adjacent the annular piston surface 706 is known, the fluid contents of each cylinder can be used, individually, sequentially or simultaneously to move the piston a specific distance, thereby effecting the dampening characteristics of the system in a relatively predetermined and precise way.

While the cylinders 751-753 can be operated in any fashion, in the embodiment shown each piston 765 and rod 766 is individually operated by a solenoid 775 and each solenoid, in turn, is operable from a remote location of the vehicle, like a cab of a motor vehicle or even the handlebar area of a motor or bicycle (not shown). Electrical power to the solenoids 775 is available from an existing power source of a vehicle or is supplied from its own source, such as on-board batteries. Because the cylinders may be operated by battery or other electric power or even manually (e.g. by syringe type plunger), there is no requirement that a so-equipped suspension rely on any pressurized vehicle hydraulic system (e.g. steering, brakes) for operation. Further, because of the fixed volume interaction with the bottom out valve there is no issue involved in stepping from hydraulic system pressure to desired suspension bottom out operating pressure.

In one embodiment, e.g., when active valve 450 is in the damping-open position, fluid flow through orifice 400 provides adequate force on the member 712 to urge it backwards, at least partially loading the spring 715 and creating fluid path 701 from the orifice 400 into a rebound portion 134 of the vehicle damping assembly 200.

The characteristics of the spring 715 are typically chosen to permit active valve 450 (e.g. member 712) to open at a predetermined bottom out pressure, with a predetermined amount of control pressure applied to port 725, during a compression stroke of vehicle damping assembly 200. For a given spring 715, higher control pressure at port 725 will result in higher bottom out pressure required to open the active valve 450 and correspondingly higher damping resistance in orifice 400 (more compression damping due to the bottom out). In one embodiment, the control pressure at port 725 is raised high enough to effectively "lock" the bottom out closed resulting in a substantially rigid compression damper (particularly true when a solid damping piston is also used).

In one embodiment, the valve is open in both directions when the valve member 712 is "topped out" against valve body 704. In another embodiment however, when the valve piston 705 is abutted or "topped out" against valve body 704 the spring 715 and relative dimensions of the active valve 450 still allow for the cone member 712 to engage the valve seat 717 thereby closing the valve. In such embodiment backflow from the rebound side of the chamber 220 to the compression side is always substantially closed and cracking pressure from flow along orifice 400 is determined by the pre-compression in the spring 715. In such embodiment, additional fluid pressure may be added to the inlet through port 725 to increase the cracking pressure for flow along orifice 400 and thereby increase compression damping through the bottom out over that value provided by the spring compression "topped out." It is generally noteworthy that while the descriptions herein often relate to compression damping bottom out and rebound shut off, some or all of the bottom out channels (or channel) on a given suspension unit may be configured to allow rebound damping bottom out and shut off or impede compression damping bottom out.

Figure 8:
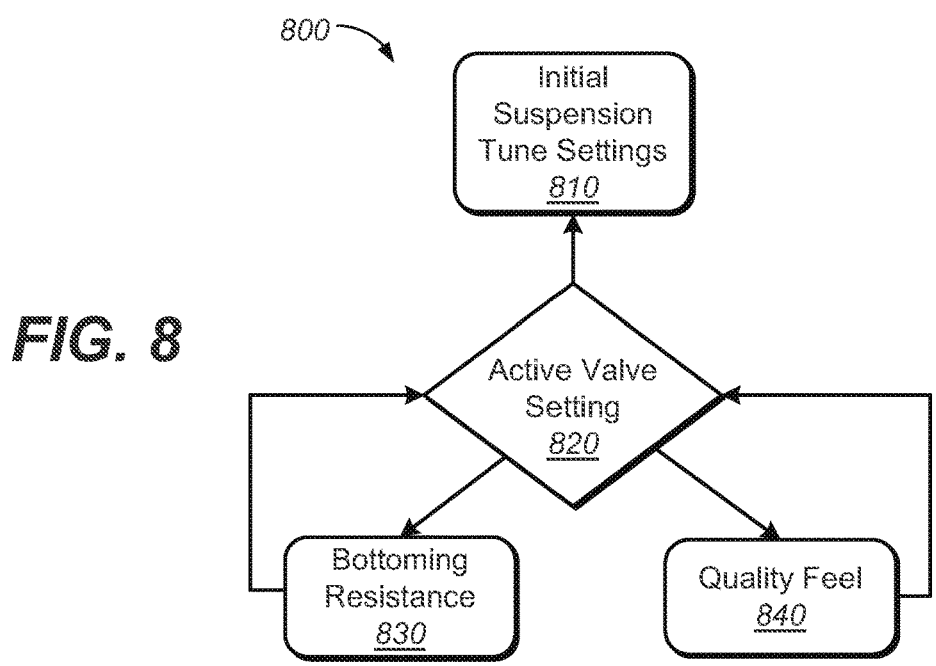
FIG. 8 is a flowchart of an embodiment for an active bottom out valve operation scheme, in accordance with an embodiment.

FIG. 8 is a flowchart 800 of an example method of operational incorporation for an active bottom out valve operation in accordance with an embodiment. Although, a number of uses can and will be realized as active valve 450 is utilized to provide an active valve or semi-active valve bottom out zone, the following is one of a plurality of possible examples that could utilize the many additional capabilities that have heretofore remained unavailable to a manually adjustable bottom out zone.

In one embodiment, during tuning of a suspension and specifically each shock absorber 100 of the suspension, the ride zone portion of the shock absorber is setup to have low damping and the bottom out zone has a heavier damping (than the ride zone portion) to prevent bottom out on square edge hits when the electronics can't respond. However, large discrepancies in the damping settings between the ride zone and the BOC can cause the transition between the two damping settings to become noticeable and intrusive.

Without active valve 450 in the BOC (e.g., in a manual adjustable BOC), a compromise tune is utilized between the damping characteristics of the main piston and the damping characteristics of the BOC to reduce the feel during the damping transition between the ride zone and the BOC.

In one embodiment, by utilizing at least one active valve 450 in shock absorber 100, the tuning of the damping characteristics of the ride zone portion and/or the bottom out zone of the shock absorber 100 can be tuned with significantly less compromise than the manually adjustable setup.

For example, when there is an active valve 450 that provides adjustable damping to the BOC, the bottom out zone damping can electronically vary based on terrain and/or rider behavior. For example, more damping when the system/rider/mapping prioritizes bottoming resistance and less damping when the system/rider/mapping prioritizes quality feel. Moreover, because of the location of the active valve 450 in the BOC there is minimal hysteresis effect and the adjustments of the active valve 450 could occur very quickly.

In another embodiment, when there is plurality of active valve 450, e.g., an active valve that provides adjustable damping to the damping portion and one that provides adjustable damping to the BOC, the ride zone damping and the bottom out zone damping can be jointly and/or independently varied based on terrain, rider behavior, speed, feel, etc. That is, more ride zone and/or bottom out zone damping when the system/rider/mapping prioritizes bottoming resistance and less ride zone and/or bottom out zone damping when the system/rider/mapping prioritizes quality feel.

At 810, the initial suspension tune setting is established. E.g., in one embodiment, the initial tune sets the ride zone portion of the shock absorber range of operation has low damping and the BO zone portion of the shock absorber range of operation to have heavier damping (than the ride zone portion) to prevent bottom out on square edge hits.

At 820, the active valve 450 BOC (or damping or both bottom out and damping) setting(s) is checked (as described in detail in FIGS. 5-7) for its present damping characteristic settings and is adjusted as needed.

At 830, the bottoming resistance is prioritized and the damping of active valve 450 is adjusted to provide more damping.

At 840, the quality feel is prioritized and the damping of active valve 450 is adjusted to provide less damping.

Although a single flowchart is shown, it should be appreciated that the flowchart 800 could be similarly utilized by each of a plurality of active valves within the single shock absorber; by every of a plurality of active valves within the single shock absorber; by an active valve in each of a plurality of shock absorbers within a vehicle suspension; by a plurality of active valves in a plurality of shock absorbers within a vehicle suspension; by every active valve in a plurality of shock absorbers within a vehicle suspension; and by every active valve in every shock absorber within a vehicle suspension.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A damper for a shock absorber comprising:
   a damper chamber divided by a piston and shaft into a compression portion and a rebound portion;
   a bottom out control feature at an end of the compression portion, said bottom out control feature comprising:
      a component connected at an end of said shaft, said component separate from said piston, said component configured such that near a limit of a compression stroke, said component causes increased dampening of said damper;
   a fluid flow path formed in the bottom out control feature for providing fluid communication from the bottom out control feature to the compression portion of the damper chamber during a compression stroke of the damper; and
   an active valve coupled with said fluid flow path, said active valve to meter a fluid flow of a working fluid through said fluid flow path.

2. The damper of claim 1, wherein the active valve is adjustable between a closed position and a plurality of open positions.

3. The damper of claim 2, wherein said working fluid flows through said fluid flow path from the bottom out control feature to the compression portion of the damper chamber at a first flow rate when said active valve is in a completely open position.

4. The damper of claim 3, wherein said working fluid flows through said fluid flow path from the bottom out control feature to the compression portion of the damper chamber at a second flow rate when said active valve is in a partially open position,
   the second flow rate is less than said first flow rate.

5. The damper of claim 2, wherein none of said working fluid flows through said fluid flow path from the bottom out control feature to the compression portion of the damper chamber when said active valve is in said closed position.

6. The damper of claim 1, further comprising:
   a blow-off valve coupled with said bottom out control feature via a second fluid path and coupled to said compression portion, said blow-off valve configured for selectively allowing a portion of said working fluid to flow, from said bottom out control feature, through said second fluid path and to said compression portion.

7. The damper of claim 6 wherein said blow-off valve and said active valve operate independently of each other.

8. The damper of claim 1, wherein said active valve comprises:
   a body having a male hex member; and
   a nipple having a female hex profile bore,
   the female hex profile bore having mating threads formed on an inside diameter thereof,
   the male hex member of the body extends into the female hex profile bore of the nipple,
   a rotation of the body causes the nipple to move toward or away from an orifice of said fluid flow path to meter the fluid flow of the working fluid through said fluid flow path.

\* \* \* \* \*